United States Patent
Fujita et al.

(10) Patent No.: US 11,907,710 B2
(45) Date of Patent: Feb. 20, 2024

(54) SOURCE CODE ANALYSIS APPARATUS

(71) Applicant: Mitsubishi Electric Corporation, Tokyo (JP)

(72) Inventors: Masaki Fujita, Tokyo (JP); Toshihiro Kobayashi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 162 days.

(21) Appl. No.: 17/761,327

(22) PCT Filed: Nov. 1, 2019

(86) PCT No.: PCT/JP2019/043034
§ 371 (c)(1),
(2) Date: Mar. 17, 2022

(87) PCT Pub. No.: WO2021/084735
PCT Pub. Date: May 6, 2021

(65) Prior Publication Data
US 2022/0342664 A1 Oct. 27, 2022

(51) Int. Cl.
*G06F 8/33* (2018.01)
*G06F 8/70* (2018.01)
(Continued)

(52) U.S. Cl.
CPC ..................... *G06F 8/75* (2013.01)

(58) Field of Classification Search
CPC ... G06F 8/75; G06F 8/433; G06F 8/72; G06F 8/71; G06F 11/3604
See application file for complete search history.

(56) References Cited

U.S. PATENT DOCUMENTS

| | | | |
|---|---|---|---|
| 10,180,836 B1 * | 1/2019 | Arguelles | .................. G06F 8/75 |
| 2010/0122240 A1 | 5/2010 | Matsuo et al. | |
| 2017/0364432 A1 | 12/2017 | Nishi | |

FOREIGN PATENT DOCUMENTS

| | | |
|---|---|---|
| JP | 2008191963 A | 8/2008 |
| WO | 2009011057 A1 | 1/2009 |
| WO | 2016121074 A1 | 8/2016 |

OTHER PUBLICATIONS

International Search Report (PCT/ISA/210) with English translation and Written Opinion (PCT/ISA/237) dated Jan. 28, 2020, by the Japan Patent Office as the International Searching Authority for International Application No. PCT/JP2019/043034.

* cited by examiner

*Primary Examiner* — Thuy Dao
(74) *Attorney, Agent, or Firm* — BUCHANAN INGERSOLL & ROONEY PC

(57) ABSTRACT

A time period required for analyzing a source code is reduced without reducing analysis accuracy in a source code analysis apparatus that analyzes a source code with a dynamic analysis method. An analysis processing unit extracts, from a post-change source code, an influence function to which an input is given by a change function. An analysis necessity determination processing unit determines whether or not the function is the analysis target function, based on a range of an input value input to the change function and a function included in the influence function. The analysis processing unit performs an analysis of the analysis target function, which is included in the change function and the influence function. An analysis result processing unit outputs an analysis result of the post-change source code, which includes an analysis result of the analysis target function.

10 Claims, 25 Drawing Sheets

(51) Int. Cl.
*G06F 9/44* (2018.01)
*G06F 8/71* (2018.01)
*G06F 11/36* (2006.01)
*G06F 8/75* (2018.01)

FIG. 3

| ID | FUNCTION NAME | VARIABLE NAME | INPUT TYPE | LOWER LIMIT VALUE | UPPER LIMIT VALUE |
|---|---|---|---|---|---|
| 0 | funcA | arg1 | ARGUMENT | 0 | 10 |
| 1 | funcA | arg2 | ARGUMENT | -5 | 5 |
| 2 | funcB | retVal | RETURN VALUE, funcC | 1 | 100 |
| 3 | funcC | g_val | GLOBAL VARIABLE | 0 | 5 |

F I G. 4

| ID | FILE PATH | FUNCTION NAME | ROW NUMBER | DETERMINATION | FAILURE OCCURRENCE VALUE | FAILURE DETAIL |
|---|---|---|---|---|---|---|
| 0 | prj/mod1/src.c | funcA | 10 | SAFE | – | – |
| 1 | prj/mod1/src.c | funcA | 11 | SAFE | – | – |
| 2 | prj/mod1/src.c | funcB | 21 | UNSAFE | arg1 5~10 | OVERFLOW |
| 3 | prj/mod1/src.c | funcB | 22 | SAFE | – | – |

FIG. 8

| ID | FUNCTION NAME | VARIABLE NAME | INPUT TYPE | LOWER LIMIT VALUE | UPPER LIMIT VALUE | VERIFIED VALUE RANGE |
|---|---|---|---|---|---|---|
| 0 | funcA | arg1 | ARGUMENT | 0 | 10 | 0~5 |
| 1 | funcA | arg2 | ARGUMENT | -5 | 5 | -5~5 |
| 2 | funcB | retVal | RETURN VALUE, funcC | 1 | 100 | 1~50 |
| 3 | funcC | g_val | GLOBAL VARIABLE | 0 | 5 | 0~5 |

F I G. 1 2

| LAYER NUMBER | FUNCTION NAME |
|---|---|
| 0 | funcA |
| 1 | funcB |
| 2 | funcC |
| 3 | funcD |
| 4 | funcE |
| 5 | funcF |

```
 1 funcA()
 2 {
 3   int a = 0;
 4   int b = 0;
 5
 6   b = funcB(a),
 7
 8   return 0;
 9 }
10 funcB(int arg1)
11 {
12   return arg1 * arg1
13 }
```
41

FIG. 17

VALUE RANGE INFORMATION 71

| ID | FUNCTION NAME | VARIABLE NAME | INPUT TYPE | LOWER LIMIT VALUE | UPPER LIMIT VALUE |
|---|---|---|---|---|---|
| 0 | funcB | arg1 | RETURN VALUE | −5 → 0 | 5 |
| ... | ... | ... | ... | ... | ... |

SOURCE CODE ANALYSIS APPARATUS

TECHNICAL FIELD

The present invention relates to a source code analysis apparatus.

BACKGROUND ART

Methods of analyzing a source code of software are roughly classified into a static analysis method and a dynamic analysis method.

In the static analysis method, a static structure of the source code is analyzed to detect whether or not there is a failure in the software.

In the dynamic analysis method, whether or not there is a failure is comprehensively detected regarding all the combinations of input values such as an argument of a function, a return value of a function, and a global variable for each function included in the source code, so as to detect whether or not there is a failure in the software. The dynamic analysis method enables detection of a failure, such as an arithmetic overflow, which cannot be detected with the static analysis method. The dynamic analysis method is adopted in Polyspace (trademark) manufactured by The MathWorks, Inc., or the like.

In recent years, as performance of a personal computer (PC) enhances further, more failures of software have been detected with the dynamic analysis method.

Meanwhile, in development projects of software, every time a source code is changed, it is expected that the source code is analyzed so as to detect influence of the change of the source code, a failure of the software caused due to the change of the source code, and the like.

The technology described in Patent Document 1 relates to verification of a source code (title of the invention). In the technology described in Patent Document 1, when a change of one of a condition for a function and a condition for a variable is detected, a function that is directly subjected to the changed condition and a function that directly invokes the function are detected as original functions in a function group that requires verification (paragraph 0015).

The technology described in Patent Document 2 relates to inspection of software (title of the invention). In the technology described in Patent Document 2, with a solver used for solving a problem of constrained nonlinear programming, whether or not there is a solution that satisfies a conditional expression is determined under given constraints and constraints on value ranges of variable values (paragraph 0007).

The technology described Patent Document 3 relates to analysis of application (title of the invention). In the technology described in Patent Document 3, details of modifications of a program along with a change of a value range of an input data item are estimated in reference to the value range based on assumed requirement information (paragraph 0017).

PRIOR ART DOCUMENTS

Patent Documents

Patent Document 1: Japanese Patent Application Laid-Open No. 2008-191963
Patent Document 2: WO 2016/121074
Patent Document 3: WO 2009/011057

SUMMARY

Problem to be Solved by the Invention

When a development project of software is a large-scale project, massive source codes are created. Thus, when the created source codes are analyzed with the dynamic analysis method, the number of combinations of input values is increased, and a time period required for analyzing the created source codes is increased. Thus, when a development project of software is a large-scale project, it is difficult to establish an environment in which created source codes are analyzed with the dynamic analysis method.

The present invention is made in view of the problem described above. The present invention has an object to reduce a time period required for analyzing a source code without reducing analysis accuracy in a source code analysis apparatus that analyzes a source code with a dynamic analysis method.

Means to Solve the Problem

The present invention relates to a source code analysis apparatus.

A source code analysis apparatus includes a change function extract processing unit, an analysis processing unit, an analysis necessity determination processing unit, and an analysis result processing unit.

The change function extract processing unit extracts a change function included in a changed part from a pre-change source code, which is included in a post-change source code.

The analysis necessity determination processing unit determines whether or not the function is the analysis target function, based on a range of an input value input to the change function and a function included in the influence function.

The analysis processing unit performs an analysis of the analysis target function determined to require being analyzed by the analysis necessity determination processing unit.

The analysis result processing unit outputs an analysis result of the post-change source code, which includes an analysis result of the analysis target function.

Effects of the Invention

According to the present invention, the analysis target function to be subjected to the analysis is limited by the change function included in the changed part from the pre-change source code and the influence function to which an input is given by the change function, which are included in the post-change source code. Thus, a time period required for analyzing the post-change source code can be reduced.

Further, according to the present invention, the analysis target function to be subjected to the analysis is further limited based on the range of the input value input to the function. Thus, a time period required for analyzing the post-change source code can further be reduced.

Further, in the present invention, with the use of the pre-change source code analysis result, the post-change source code analysis result similar to the post-change source code analysis result output when the analysis of all of the functions included in the post-change source code are performed can be output. Therefore, a time period required for analyzing the post-change source code can be reduced without reducing accuracy of analysis.

These and other objects, features, aspects and advantages of the present invention will become more apparent from the following detailed description of the present invention when taken in conjunction with the accompanying drawings.

BRIEF DESCRIPTION OF DRAWINGS

FIG. 3 is a table showing an example of value range information stored in the source code analysis apparatus of the first embodiment.

FIG. 4 is a table showing an example of determination information stored in the source code analysis apparatus of the first embodiment.

FIG. 8 is a table showing an example of value range information stored in the source code analysis apparatus of the second embodiment.

FIG. 12 is a table showing an example of layer numbers assigned to functions included in the layered structure indicated by the software layer information input to the source code analysis apparatus of the first embodiment.

FIG. 16 is a diagram illustrating an example of a post-change source code input to the source code analysis apparatus of the fourth embodiment.

FIG. 17 is a diagram illustrating an example of value range information stored in the source code analysis apparatus of the fourth embodiment.

DESCRIPTION OF EMBODIMENTS

1 First Embodiment 1.1 Hardware Configuration

Figure 1:
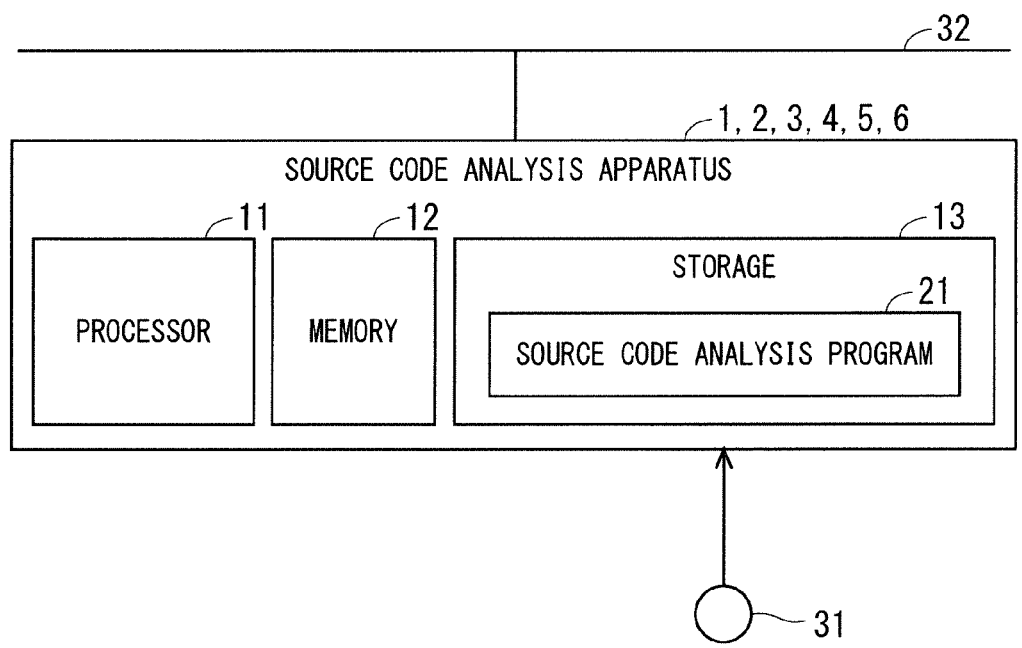
FIG. 1 is a block diagram schematically illustrating a hardware configuration of a source code analysis apparatus of the first to sixth embodiments.

FIG. 1 is a block diagram schematically illustrating a hardware configuration of a source code analysis apparatus of the first embodiment.

A source code analysis apparatus 1 illustrated in FIG. 1 is a personal computer (PC) in which a source code analysis program 21 is installed.

As illustrated in FIG. 1, the source code analysis apparatus 1 includes a processor 11, a memory 12, and a storage 13.

In the storage 13, the source code analysis program 21 is installed. The installation of the source code analysis program 21 may be performed by writing the source code analysis program 21 read from an external recording medium 31 in the storage 13, or may be performed by writing the source code analysis program 21 received via a network 32 in the storage 13.

The processor 11 is a central processing unit (CPU), a graphics processing apparatus (GPU), a digital signal processing apparatus (DSP), or the like. The memory 12 is a random access memory (RAM) or the like. The storage 13 is a hard disk drive, a solid state drive, a RAM disk, or the like. The external recording medium 31 is a compact disc (CD), a digital versatile disc (DVD), a Blu-ray disc (BD), a universal serial bus (USB) memory, or the like.

The memory 12, the storage 13, and the external recording medium 31 are non-transitory computer-readable recording media recording the source code analysis program 21.

In the source code analysis apparatus 1, the source code analysis program 21 installed in the storage 13 is loaded into the memory 12, the loaded source code analysis program 21 is executed by the processor 11, and the PC thereby functions as the source code analysis apparatus 1.

1.2 Functional Configuration

Figure 2:
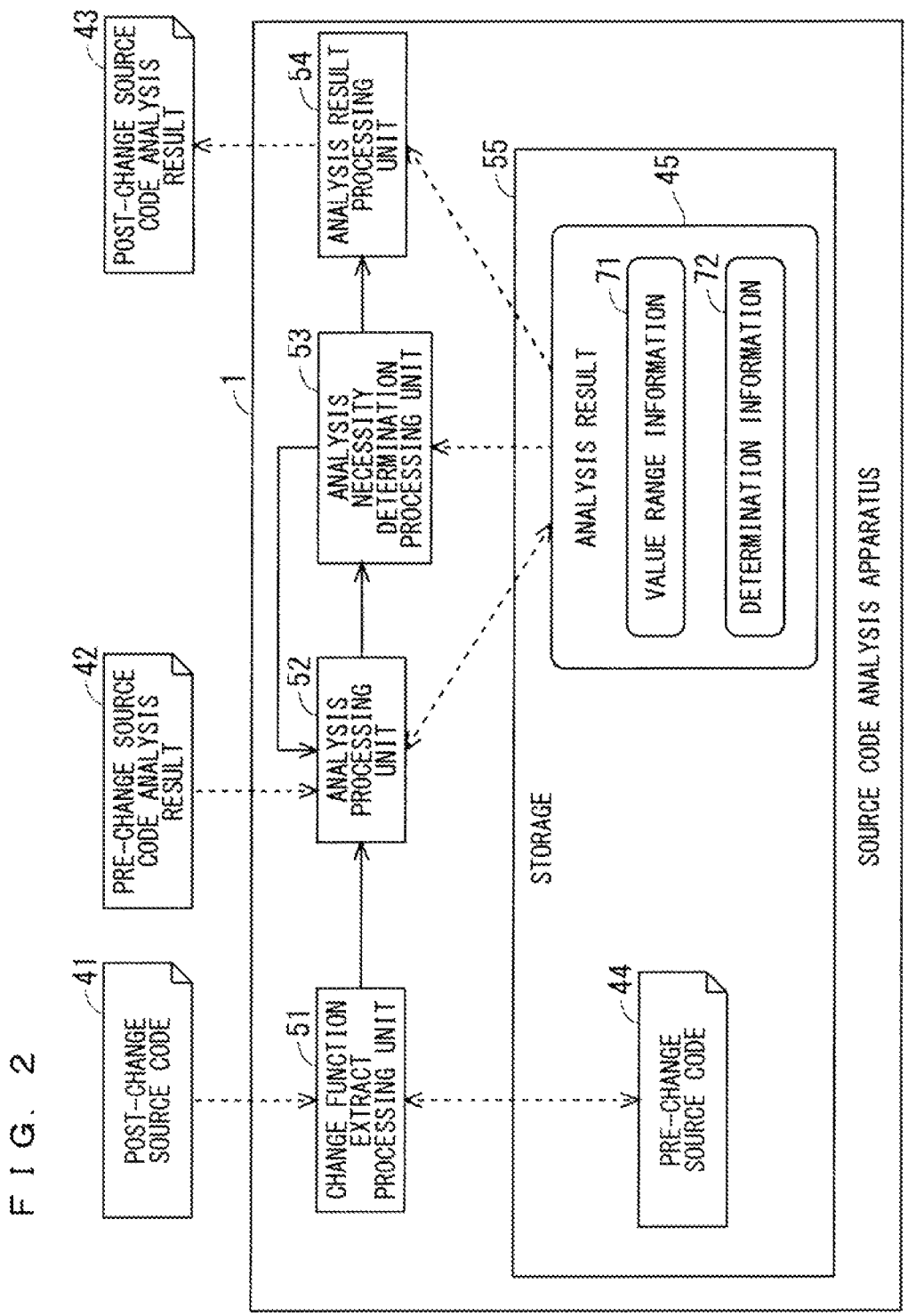
FIG. 2 is a block diagram schematically illustrating a functional configuration of the source code analysis apparatus of the first embodiment.

FIG. 2 is a block diagram schematically illustrating a functional configuration of the source code analysis apparatus of the first embodiment.

The source code analysis apparatus 1 illustrated in FIG. 2 analyzes a source code by using a dynamic analysis method.

As illustrated in FIG. 2, to the source code analysis apparatus 1, a post-change source code 41 and a pre-change source code analysis result 42 are input. The source code analysis apparatus 1 generates a post-change source code analysis result 43 by analyzing the post-change source code 41 by using the input pre-change source code analysis result 42, and outputs the generated post-change source code analysis result 43. The input post-change source code 41 and pre-change source code analysis result 42 and the output post-change source code analysis result 43 are each a file.

As illustrated in FIG. 2, the source code analysis apparatus 1 includes a change function extract processing unit 51, an analysis processing unit 52, an analysis necessity determination processing unit 53, an analysis result processing unit 54, and a storage 55. The storage 55 may be provided outside of the source code analysis apparatus 1.

The change function extract processing unit 51, the analysis processing unit 52, the analysis necessity determination processing unit 53, and the analysis result processing unit 54 are configured when the processor 11 executes the source code analysis program 21. All or a part of the change function extract processing unit 51, the analysis processing unit 52, the analysis necessity determination processing unit 53, and the analysis result processing unit 54 may be configured with hardware that does not execute a program. The storage 55 is configured with at least one of the memory 12 and the storage 13.

As illustrated in FIG. 2, the storage 55 stores a pre-change source code 44 and an analysis result 45. As illustrated in FIG. 2, the analysis result 45 includes value range information 71 and determination information 72.

The analysis result 45 is generated by deploying the pre-change source code analysis result 42 and updating the deployed analysis result. The value range information 71 indicates a range of an input value input to a function. The determination information 72 indicates a result obtained after determining whether or not a failure occurs in each row included in an analysis target function. The result obtained after determining whether or not a failure occurs is, for example, "safe", "unsafe", or "unsafe depending on a condition". "Safe" indicates that a failure does not occur. "Unsafe" indicates that a failure occurs invariably. "Unsafe depending on a condition" indicates that a failure occurs depending on a condition.

The change function extract processing unit 51 acquires the post-change source code 41 input to the source code analysis apparatus 1 and the pre-change source code 44 stored in the storage 55.

Further, the change function extract processing unit 51 extracts a change function included in a changed part from the acquired pre-change source code 44, which is included in the acquired post-change source code 41. When the change function extract processing unit 51 extracts a change function, the change function extract processing unit 51 extracts a difference between the post-change source code 41 and the pre-change source code 44. The extracted difference includes information of a function and a global variable respectively changed from a function and a global variable included in the pre-change source code 44, and a function and a global variable added to the pre-change source code 44. The change function extract processing unit 51 refers to the information, and extracts change functions from the extracted difference. The extracted change functions are a function changed from the function included in the pre-change source code 44 and a function added to the pre-change source code 44.

Further, when the change function extract processing unit 51 extracts the difference, the change function extract processing unit 51 stores the acquired post-change source code 41 in the storage 55. The stored post-change source code 41 is used as the pre-change source code 44 when the post-change source code 41 subsequently input to the source code analysis apparatus 1 is analyzed.

The analysis processing unit 52 acquires the change function extracted by the change function extract processing unit 51.

Further, the analysis processing unit 52 extracts, from the post-change source code 41, an influence function to which an input is given by the acquired change function. When the change function gives an input to the influence function, an input value is input to the influence function. The extracted influence function and an input value input thereto are subjected to influence of change of the change function.

When a function funcA( ) invokes a function funcB(arg1) having an argument arg1, the function funcA( ) gives an input to the function funcB(arg1), and the argument arg1 is an input value input to the function funcB(arg1).

When a function funcB( ) that returns a return value is invoked from a function funcA( ), the function funcB( ) gives an input to the function funcA( ), and the return value is an input value input to the function funcA( ).

The function funcA( ) overwrites a global variable g_val_A, and when the function funcB(arg1) reads the global variable g_val_A, the function funcA( ) gives an input to the function funcB(arg1), and the global variable g_val_A is an input value input to the function funcB(arg1).

The analysis necessity determination processing unit 53 acquires the change function extracted by the change function extract processing unit 51, the influence function extracted by the analysis processing unit 52, and the value range information 71 included in the analysis result 45 stored in the storage 55.

Further, the analysis necessity determination processing unit 53 determines whether or not the acquired change function and the function included in the influence function are analysis target functions. When the analysis necessity determination processing unit 53 determines whether or not a function is an analysis target function, the analysis necessity determination processing unit 53 determines whether or not the function is an analysis target function, based on a range of the input value input to the function. In the first embodiment, when the range of the input value input to the function in the post-change source code 41 is narrower than the range of the input value input to the function in the pre-change source code 44, the analysis necessity determination processing unit 53 determines that the function is not the analysis target function, whereas when the range of the input value input to the function in the post-change source code 41 is wider than the range of the input value input to the function in the pre-change source code 44, the analysis necessity determination processing unit 53 determines that the function is the analysis target function.

The input value input to the function includes at least one selected from the group consisting of an argument of the function, a return value returned by another function invoked by the function, and a global variable read by the function.

The range of the argument is determined by analyzing the argument given to the function when a function having the argument is invoked. The range of the return value is determined by analyzing the entire function. The range of the global variable is determined by analyzing the function that overwrites the global variable.

Further, the analysis necessity determination processing unit 53 notifies the analysis processing unit 52 of a result obtained after determining whether or not the variable is an analysis target function. In this manner, the analysis processing unit 52 can perform an analysis of the analysis target function determined to require being analyzed by the analysis necessity determination processing unit 53.

The analysis processing unit 52 performs an analysis of the analysis target function determined to require being analyzed by the analysis necessity determination processing unit 53, which is included in the acquired change function and the extracted influence function. However, the analysis processing unit 52 need not necessarily perform an analysis of functions other than the analysis target function except the processing of extracting the influence function described above. Thus, in the first embodiment, the analysis processing unit 52 does not perform an analysis of functions other than the analysis target function except the processing of extracting the influence function described above. The analysis of the analysis target function includes determining whether or not a failure occurs in each row included in the analysis target function. In the analysis of the analysis target function, the analysis processing unit 52 performs verification by changing the input value input to the analysis target function. The result obtained after determining whether or not a failure occurs is, for example, "safe", "unsafe", or "unsafe depending on a condition".

Further, the analysis processing unit 52 acquires the pre-change source code analysis result 42 input to the source code analysis apparatus 1.

Further, the analysis processing unit 52 deploys the acquired pre-change source code analysis result 42 and generates an analysis result. Further, the analysis processing unit 52 updates the generated analysis result so that the updated analysis result 45 includes an analysis result of the analysis target function. Further, the analysis processing unit 52 stores the updated analysis result 45 in the storage 55. When the analysis processing unit 52 updates the analysis result 45, the analysis processing unit 52 includes the value range information 71 and the determination information 72 in the analysis result 45.

The analysis result processing unit 54 acquires the stored analysis result 45.

Further, the analysis result processing unit 54 generates the post-change source code analysis result 43, based on the acquired analysis result 45. The generated post-change source code analysis result 43 includes an analysis result of the analysis target function.

Further, the analysis result processing unit 54 outputs the generated post-change source code analysis result 43.

1.3 Example of Value Range Information

FIG. 3 is a table showing an example of the value range information stored in the source code analysis apparatus of the first embodiment.

As illustrated in FIG. 3, the value range information 71 includes a plurality of elements 81.

As illustrated in FIG. 3, each element included in the plurality of elements 81 includes an identifier (ID), a function name, a variable name, an input type, an upper limit value, and a lower limit value.

The ID indicates a number assigned to each element. The number assigned to each element is a number specific to each element.

The function name indicates a function name of a function being a target of each element.

The variable name indicates a variable name of a variable in which an input value input to a function being a target of each element is put.

The input type indicates a type of input value input to a function being a target of each element. The input type is an argument, a return value, or a global variable. When the input type is a return value, the input type also indicates a function name of a function that returns the return value.

The upper limit value and the lower limit value respectively indicate an upper limit value and a lower limit value of the range of the input value input to the function being a target of each element. The upper limit value and the lower limit value are determined by the analysis processing unit 52 determining the range of the input value input to the function.

The value range information 71 includes elements assigned IDs of 0, 1, 2, and 3. Elements assigned IDs of 0 and 1 indicate that arguments arg1 and arg2 of the function funcA are input to the function funcA, the argument arg1 has a value range of 0 or more and 10 or less, and the argument arg2 has a value range of −5 or more and 5 or less. An element assigned an ID of 2 indicates that a return value retVal returned by a function funcC is input to the function funcB, and the return value retVal has a value range of 1 or more and 100 or less. An element assigned an ID of 3 indicates that a global variable g_val is input to the function funcC, and the global variable g_val has a value range of 0 or more and 5 or less.

1.4 Example of Determination Information

FIG. 4 is a table showing an example of the determination information stored in the source code analysis apparatus of the first embodiment.

As illustrated in FIG. 4, the determination information 72 includes a plurality of elements 91.

As illustrated in FIG. 4, each element included in the plurality of elements 91 includes an ID, a file path, a function name, a row number, determination, a failure occurrence value, and a failure detail.

The ID indicates a number assigned to each element. The number assigned to each element is a number specific to each element.

A file path indicates a file path of a file including a row in which determination being a target of each element is performed.

A function name indicates a function name of a function including a row in which determination being a target of each element is performed.

A row number indicates a row in which determination being a target of each element is performed.

Determination indicates a result of determination being a target of each element. The result of the determination is, for example, "safe", "unsafe", or "unsafe depending on a condition".

A failure occurrence value indicates a variable name in which an input value determined to be unsafe is put and a range of the input value determined to be unsafe when the result of determination being a target of each element is "unsafe" or "unsafe depending on a condition".

A failure detail indicates a detail of a failure that occurs when the result of determination being a target of each element is "unsafe" or "unsafe depending on a condition".

The determination information 72 illustrated in FIG. 4 includes elements assigned IDs of 0, 1, 2, and 3. The elements assigned IDs of 0, 1, 2, and 3 indicate that determination of a row included in a file having a file path of prj/mod1/src.c is performed. An element assigned an ID of 0 indicates that a failure does not occur in the 10th row included in the function funcA. An element assigned an ID of 1 indicates that a failure does not occur in the 11th row included in the function funcA. An element assigned an ID of 2 indicates that a failure of an overflow occurs when an input value arg is 5 or more and 10 or less in the 21st row included in the function funcB. An element assigned an ID of 3 indicates that a failure does not occur in the 22nd row included in the function funcB.

1.5 Processing Performed by Source Code Analysis Apparatus

Figure 5:
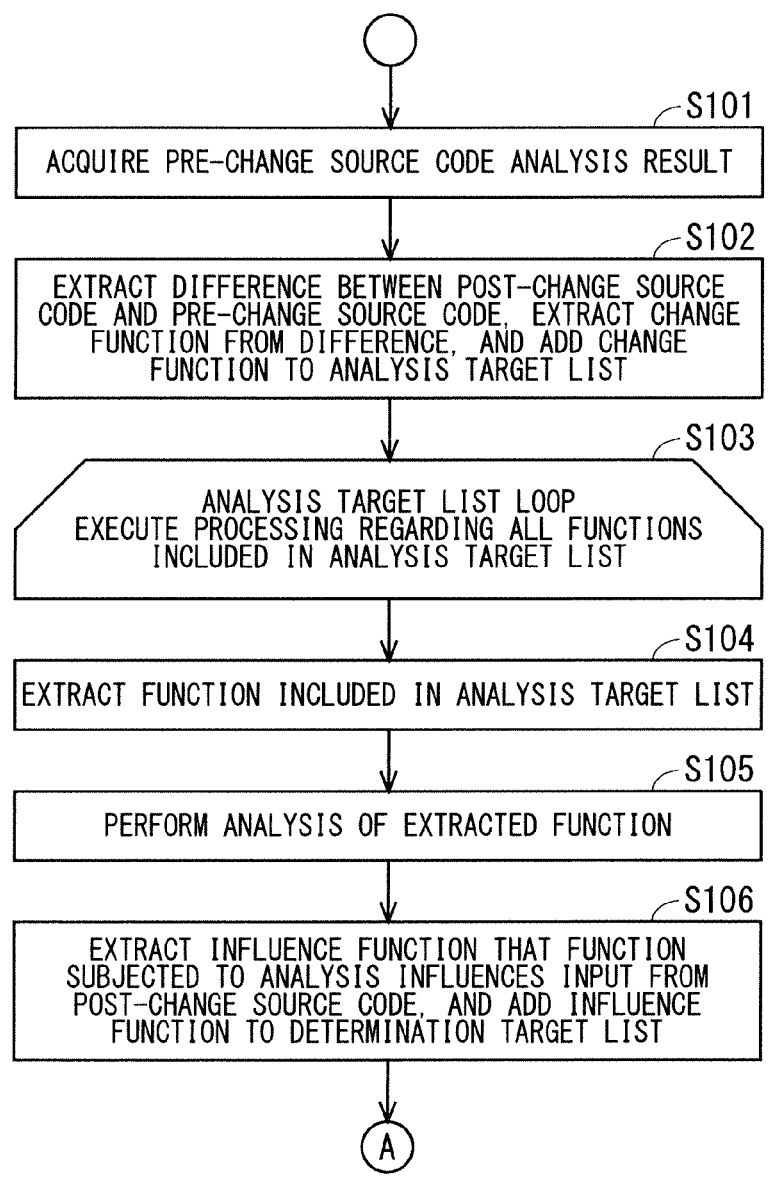
FIG. 5 is a flowchart illustrating a flow of processing performed by the source code analysis apparatus of the first embodiment.
Figure 6:
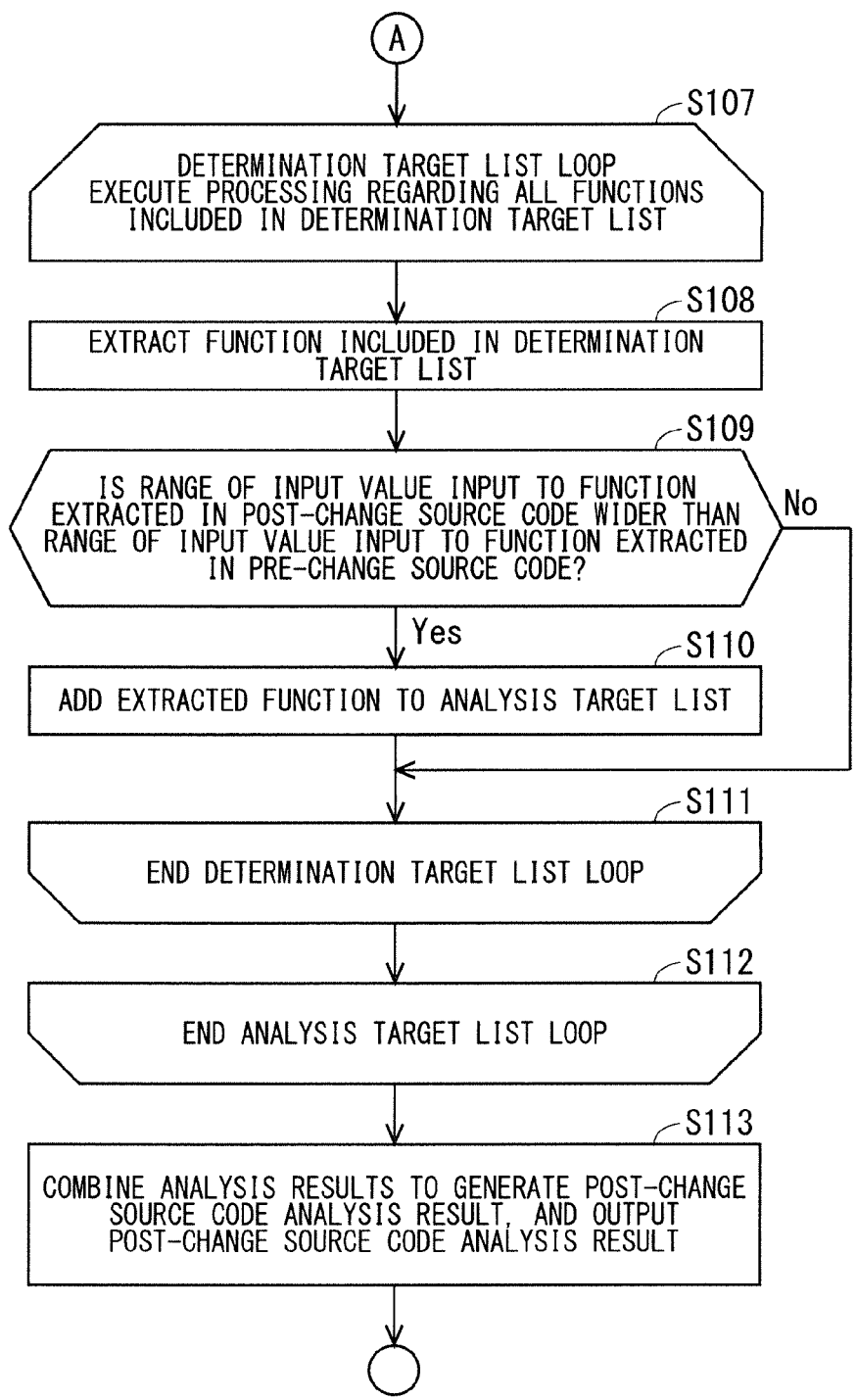
FIG. 6 is a flowchart illustrating a flow of processing performed by the source code analysis apparatus of the first embodiment.

FIG. 5 and FIG. 6 are flowcharts illustrating a flow of processing performed by the source code analysis apparatus of the first embodiment.

The source code analysis apparatus 1 executes Steps S101 to S113 illustrated in FIG. 5 and FIG. 6 on the condition that the source code analysis apparatus 1 has previously analyzed a source code, the storage 55 stores the pre-change source code 44, and the pre-change source code analysis result 42 is present.

In Step S101, the analysis processing unit 52 acquires the pre-change source code analysis result 42 input to the source code analysis apparatus 1.

In subsequent Step S102, the change function extract processing unit 51 acquires the post-change source code 41 input to the source code analysis apparatus 1 and the pre-change source code 44 stored in the storage 55. Further, the change function extract processing unit 51 extracts a difference between the post-change source code 41 and the pre-change source code 44. Further, the change function extract processing unit 51 extracts the change function from the extracted difference. Further, the change function extract processing unit 51 adds the extracted change function to an analysis target list. Further, the change function extract processing unit 51 stores the acquired post-change source code 41 in the storage 55.

In an analysis target list loop of subsequent Steps S103 to S112, processing is repeatedly executed until processing of Steps S104 to S111 is executed regarding all of the functions included in the analysis target list.

In Step S104, the analysis processing unit 52 extracts a function included in the analysis target list.

In subsequent Step S105, the analysis processing unit 52 performs an analysis of the extracted function.

In subsequent Step S106, the analysis processing unit 52 extracts the influence function that the function subjected to the analysis influences input from the post-change source code 41. The extracted influence function may be a single function, or may be a plurality of functions. Further, the analysis processing unit 52 adds the extracted influence function to a determination target list.

In a determination target list loop of subsequent Steps S107 to S111, processing is repeatedly executed until processing of Steps S108 to S110 is executed regarding all of the functions included in the determination target list.

In Step S108, the analysis necessity determination processing unit 53 extracts a function included in the determination target list.

In subsequent Step S109, the analysis necessity determination processing unit 53 acquires the value range information 71 included in the analysis result 45 stored in the storage 55. Further, the analysis necessity determination processing unit 53 determines whether or not the range of the input value input to the function extracted in the post-change source code 41 is wider than the range of the input value input to the function extracted in the pre-change source code 44. When it is determined that the range of the input value of the former is wider than the range of the input value of the latter, Step S110 is executed. When it is determined that the range of the input value of the former is narrower than the range of the input value of the latter, Step S111 is executed. In this manner, whether or not the extracted function is an analysis target function is determined.

In Step S110, the analysis necessity determination processing unit 53 adds the extracted function to the analysis target list. In this manner, the analysis target function is added to the analysis target list.

In Step S113, the analysis result processing unit 54 acquires the analysis result 45. Further, the analysis result processing unit 54 combines the acquired analysis results 45 to generate the post-change source code analysis result 43. Further, the analysis result processing unit 54 outputs the generated post-change source code analysis result 43.

1.6 Effects of Invention of First Embodiment

According to the invention of the first embodiment, the analysis target function to be subjected to the analysis is limited by the change function included in the changed part from the pre-change source code 44 and the influence function to which an input is given by the change function, which are included in the post-change source code 41. Thus, a time period required for analyzing the post-change source code 41 can be reduced.

Further, according to the invention of the first embodiment, the analysis target function to be subjected to the analysis is further limited based on the range of the input value input to the function. Thus, a time period required for analyzing the post-change source code 41 can further be reduced.

Further, in the invention of the first embodiment, with the use of the pre-change source code analysis result 42, the post-change source code analysis result 43 similar to the post-change source code analysis result output when the analysis of all of the functions included in the post-change source code 41 are performed can be output. Therefore, a time period required for analyzing the post-change source code 41 can be reduced without reducing accuracy of analysis.

2 Second Embodiment

In the following, configurations of a source code analysis apparatus of the second embodiment different from those of the source code analysis apparatus 1 of the first embodiment will be described. Regarding configurations that are not described, configurations similar to the configurations adopted in the source code analysis apparatus 1 of the first embodiment are also adopted in the source code analysis apparatus of the second embodiment.

FIG. 1 is also a block diagram schematically illustrating a hardware configuration of a source code analysis apparatus of the second embodiment.

Figure 7:
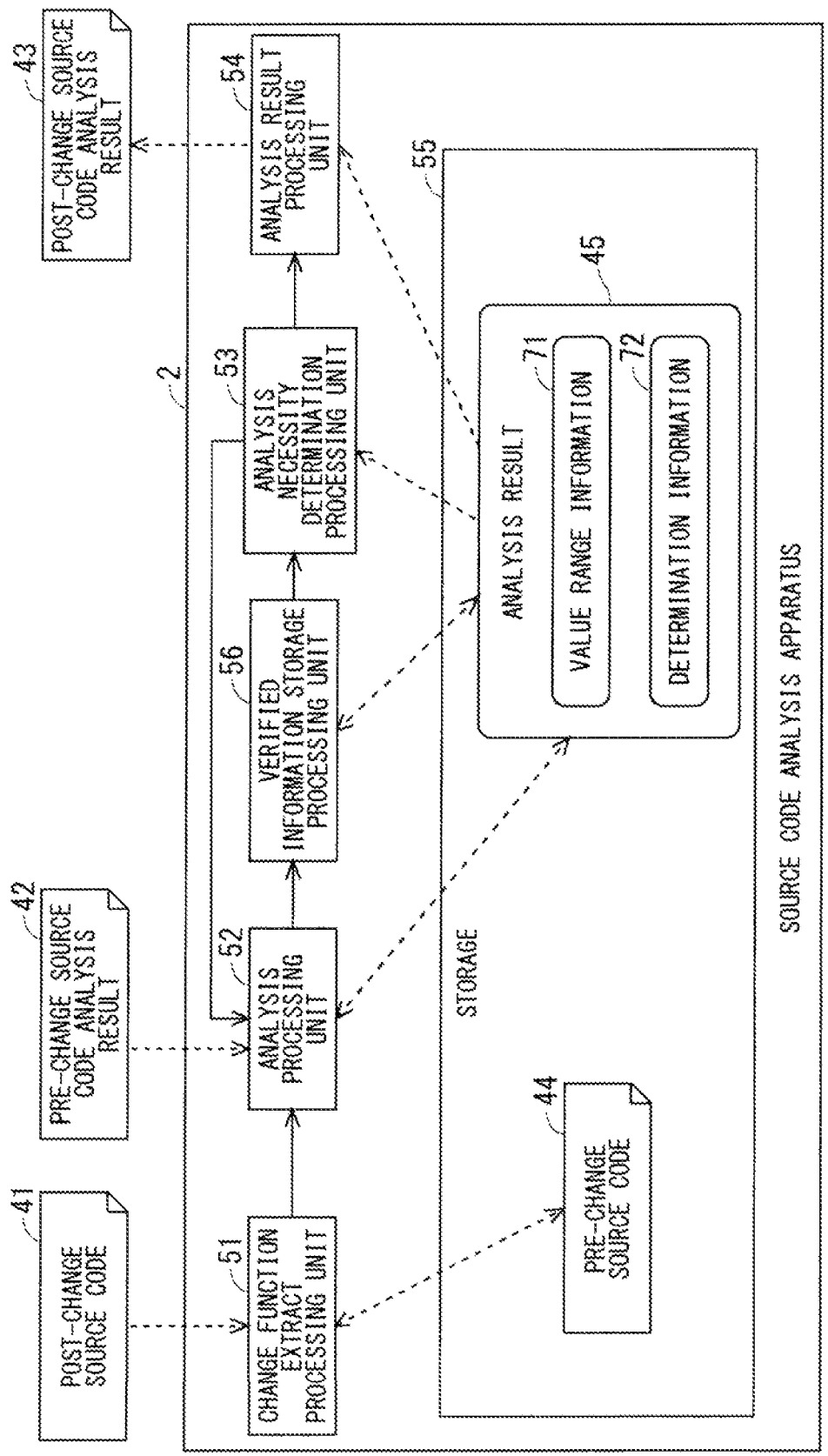
FIG. 7 is a block diagram schematically illustrating a functional configuration of the source code analysis apparatus of the second embodiment.

FIG. 7 is a block diagram schematically illustrating a functional configuration of the source code analysis apparatus of the second embodiment.

A source code analysis apparatus 2 of the second embodiment illustrated in FIG. 7 is different from the source code analysis apparatus 1 of the first embodiment illustrated in FIG. 2 in that a verified information storage processing unit 56 is further included.

The verified information storage processing unit 56 stores verified information indicating a value subjected to verification by the analysis processing unit 52 in the storage 55. The stored verified information is included in the value range information 71. In the second embodiment, the verified information included in the value range information 71 is a verified value range indicating a range of the value subjected to verification.

When verification is already performed by the analysis processing unit 52 in analysis of the analysis target function, the analysis processing unit 52 performs verification of values other than the value subjected to verification indicated by the verified information by changing the input value input to the analysis target function. In this manner, the analysis processing unit 52 performs new verification of values not subjected to verification by changing the input value input to the analysis target function. In this manner, a time period required for analyzing the post-change source code 41 can further be reduced.

FIG. 8 is a table showing an example of the value range information stored in the source code analysis apparatus of the second embodiment.

The value range information 71 illustrated in FIG. 8 is different from the value range information 71 illustrated in FIG. 3 in that a verified value range is included.

A verified value range indicates a range in which verification of the input value input to the function being a target of each element is performed. The verified value range is updated by the verified information storage processing unit 56 after verification is performed by the analysis processing unit 52.

An element assigned an ID of 0 indicates that verification is already performed in a range of 0 or more and 5 or less regarding the argument arg1. Thus, the analysis processing unit 52 performs verification regarding values smaller than 0 or values larger than 5 after the verification is performed. An element assigned an ID of 1 indicates that verification is already performed in a range of −5 or more and 5 or less regarding the argument arg2. Thus, the analysis processing unit 52 performs verification regarding values smaller than −5 or values larger than 5 after the verification is performed. An element assigned an ID of 2 indicates that verification is already performed in a range of 1 or more and 50 or less regarding the return value retVal. Thus, the analysis processing unit 52 performs verification regarding values smaller than 1 or values larger than 50 after the verification is performed. An element assigned an ID of 3 indicates that verification is already performed in a range of 0 or more and 5 or less regarding the global variable g_val. Thus, the analysis processing unit 52 performs verification regarding values smaller than 0 or values larger than 5 after the verification is performed.

Figure 9:
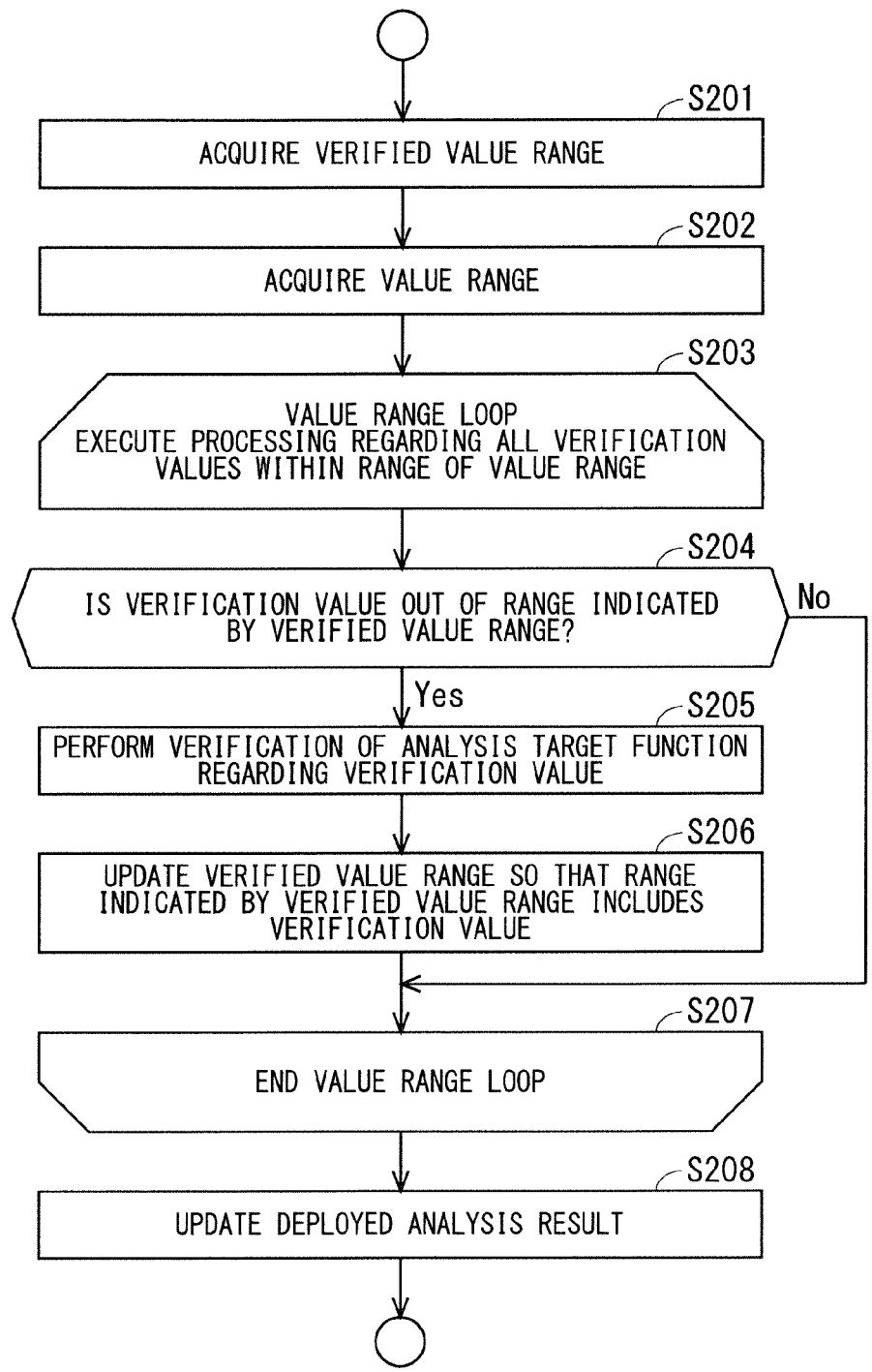
FIG. 9 is a flowchart illustrating a flow of processing performed by the source code analysis apparatus of the second embodiment.

FIG. 9 is a flowchart illustrating a flow of processing performed by the source code analysis apparatus of the second embodiment.

The source code analysis apparatus 2 executes Steps S201 to S208 illustrated in FIG. 9.

In Step S201, the analysis processing unit 52 acquires the verified value range included in the value range information 71 stored in the storage 55.

In subsequent Step S202, the analysis processing unit 52 acquires the value range included in the value range information 71 stored in the storage 55.

In a value range loop of subsequent Steps S203 to S207, processing is repeatedly executed until processing of Steps S204 to S206 is executed regarding all of the verification values within the range of the value range. The verification value is increased from the lower limit value of the value range toward the upper limit value of the value range every time the processing is executed.

In Step S204, the analysis processing unit 52 determines whether or not the verification value is out of the range indicated by the acquired verified value range. When it is determined that the verification value is out of the range of the acquired verified value range, Step S205 is executed. When it is determined that the verification value is within the range indicated by the acquired verified value range, Step S207 is executed.

In Step S205, the analysis processing unit 52 performs verification of the analysis target function regarding the verification value. The verification is performed for all of the rows included in the analysis target function.

In subsequent Step S206, the verified information storage processing unit 56 updates the verified value range so that the range indicated by the verified value range included in the value range information 71 stored in the storage 55 includes the verification value. In this manner, the lower limit value or the upper limit value of the verified value range is updated.

In Step S208, the analysis processing unit 52 updates the analysis result 45.

The source code analysis apparatus 2 of the second embodiment has effects similar to the effects of the source code analysis apparatus 1 of the first embodiment.

In addition, according to the source code analysis apparatus 2 of the second embodiment, verification can be less liable to be performed again regarding the value subjected to verification. Thus, a time period required for analyzing the post-change source code 41 can be reduced.

3 Third Embodiment

In the following, configurations of a source code analysis apparatus of the third embodiment different from those of the source code analysis apparatus 1 of the first embodiment will be described. Regarding configurations that are not described, configurations similar to the configurations adopted in the source code analysis apparatus 1 of the first embodiment are also adopted in the source code analysis apparatus of the third embodiment.

FIG. 1 is also a block diagram schematically illustrating a hardware configuration of a source code analysis apparatus of the third embodiment.

Figure 10:
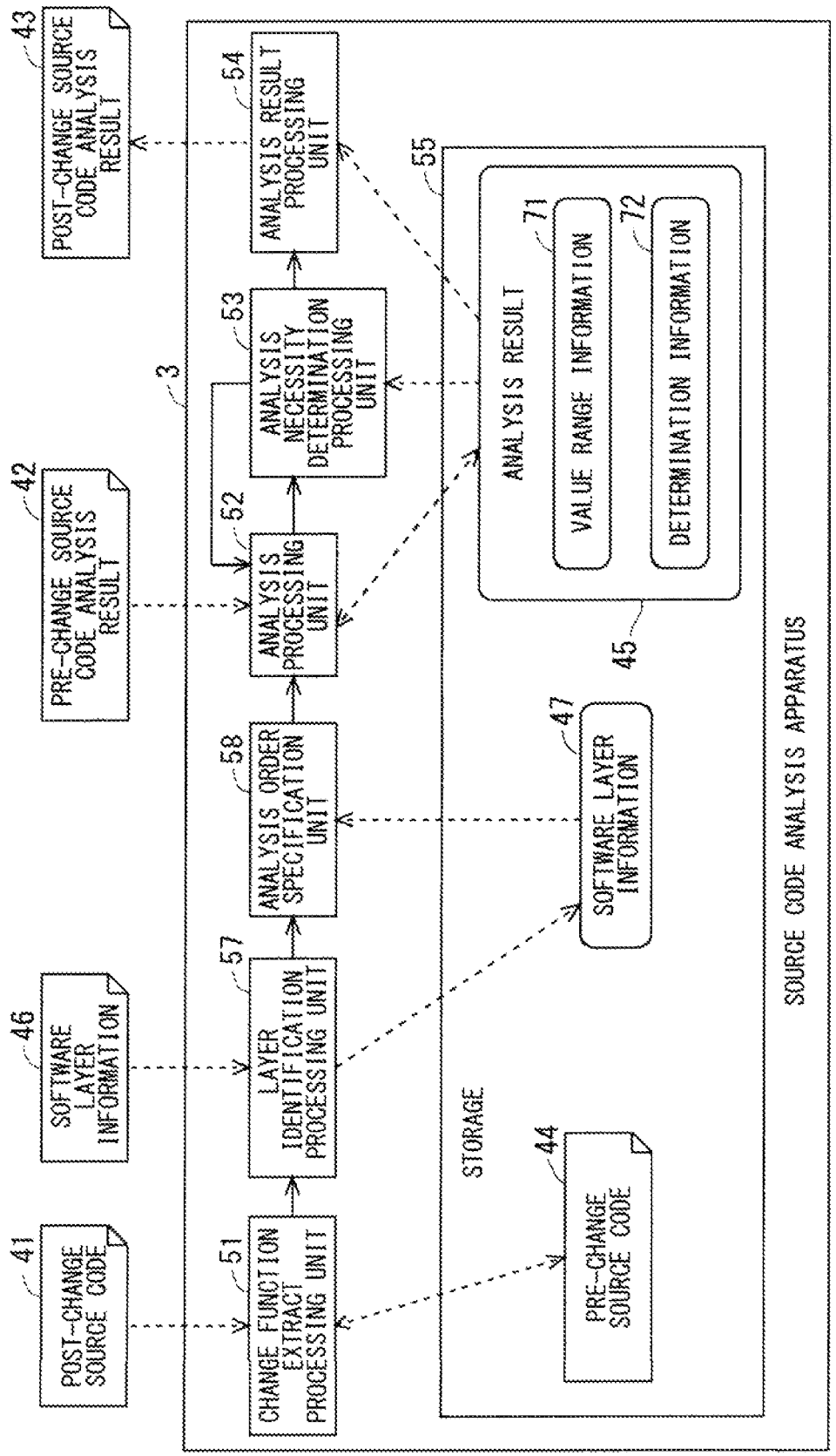
FIG. 10 is a block diagram schematically illustrating a functional configuration of the source code analysis apparatus of the third embodiment.

FIG. 10 is a block diagram schematically illustrating a functional configuration of the source code analysis apparatus of the third embodiment.

A source code analysis apparatus 3 of the third embodiment illustrated in FIG. 10 is different from the source code analysis apparatus 1 of the first embodiment illustrated in FIG. 2 in that software layer information 46 is further input, a layer identification processing unit 57 and an analysis order specification unit 58 are further included, and software layer information 47 is further stored in the storage 55. The input software layer information 46 is a file.

The software layer information 46 indicates a layered structure of the functions included in the post-change source code 41. The software layer information 47 indicates a call tree of the functions included in the post-change source code 41. The call tree indicates order of invoking the functions. Thus, by referring to the software layer information 47, functions included in a higher module of software and functions included in a lower module of the software can be distinguished from each other.

The layer identification processing unit 57 acquires the software layer information 46 input to the source code analysis apparatus 3.

Further, the layer identification processing unit 57 generates the software layer information 47 indicating the call tree of the functions included in the post-change source code 41 from the layered structure of the functions included in the post-change source code 41 indicated by the acquired software layer information 46. In this manner, the layer identification processing unit 57 can identify the layer to which the analysis target function belongs in the layered structure of the functions included in the post-change source code 41.

Further, the layer identification processing unit 57 stores the generated software layer information 47 in the storage 55.

The analysis order specification unit 58 specifies analysis order of the analysis target functions. The specified analysis order of the analysis target functions indicates priority of analysis of the analysis target functions. Thus, when the analysis order of the analysis target functions is specified, the analysis processing unit 52 performs the analysis of the analysis target functions sequentially in the analysis order of the analysis target functions from the analysis target function having high analysis priority to the analysis target function having low analysis priority.

In the analysis order of the analysis target functions specified by the analysis order specification unit 58, the analysis is performed later as the layer to which the analysis target function belongs is higher in the layered structure of the functions included in the post-change source code 41 identified by the layer identification processing unit 57.

The analysis processing unit 52 performs the analysis of the analysis target functions sequentially in the specified analysis order of the analysis target functions. In this manner, the analysis processing unit 52 performs the analysis of the analysis target functions sequentially from the analysis target function included in a higher module to the analysis target function included in a lower module. Further, the analysis processing unit 52 performs the analysis of the analysis target functions in order of invoking the analysis target functions.

Figure 11:
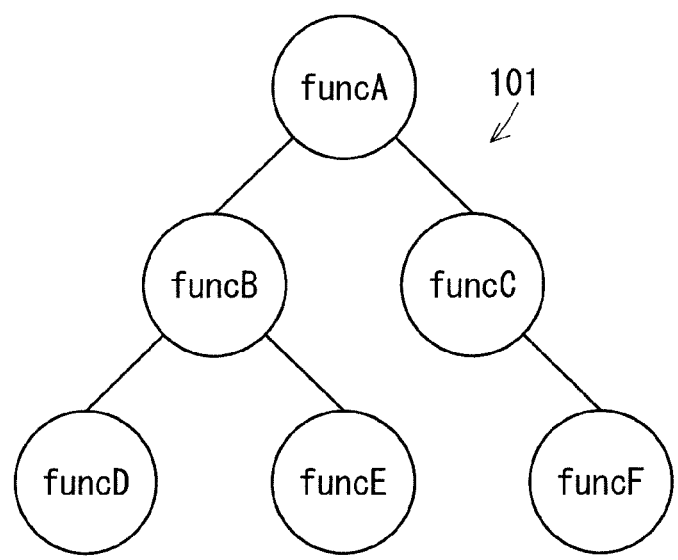
FIG. 11 is a tree illustrating an example of a layered structure indicated by software layer information input to the source code analysis apparatus of the first embodiment.

FIG. 11 is a tree illustrating an example of the layered structure indicated by the software layer information input to the source code analysis apparatus of the first embodiment. FIG. 12 is a table showing an example of layer numbers assigned to the functions included in the layered structure indicated by the software layer information input to the source code analysis apparatus of the first embodiment.

A tree 101 illustrated in FIG. 11 indicates that the layered structure indicated by the software layer information 46 includes functions funcA, funcB, funcC, funcD, funcE, and funcF. Further, the tree 101 indicates that the function funcA belongs to a layer that is one layer higher than the layer to which the functions funcB and funcC belong. Further, the tree 101 indicates that the function funcB belongs to a layer that is one layer higher than the layer to which the functions funcD and funcE belong. Further, the tree 101 indicates that the function funcC belongs to a layer that is one layer higher than the layer to which the function funcF belongs.

When the software layer information 46 has the layered structure indicated by the tree 101, as shown in table 111 illustrated in FIG. 12, layer numbers are sequentially assigned to the function funcA belonging to a higher layer, the functions funcB and funcC belonging to an intermediate layer, and the functions funcD, funcE, and funcF belonging to a lower layer, and the layer numbers 0, 1, 2, 3, 4, and 5 are respectively assigned to the functions funcA, funcB, funcC, funcD, funcE, and funcF. When a small layer number is assigned to a function, it means that priority of the analysis of the function is high.

Figure 13:
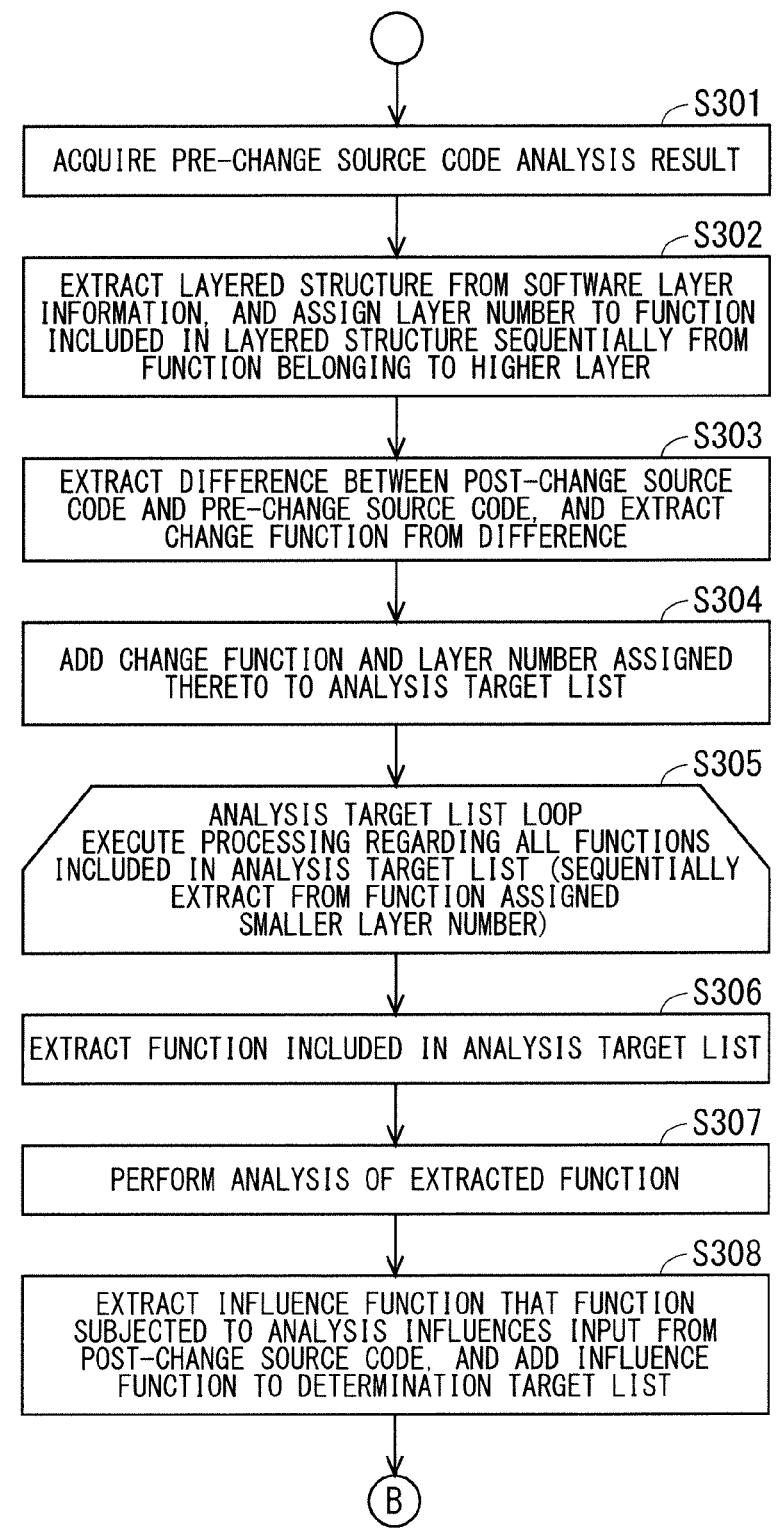
FIG. 13 is a flowchart illustrating a flow of processing performed by the source code analysis apparatus of the third embodiment.
Figure 14:
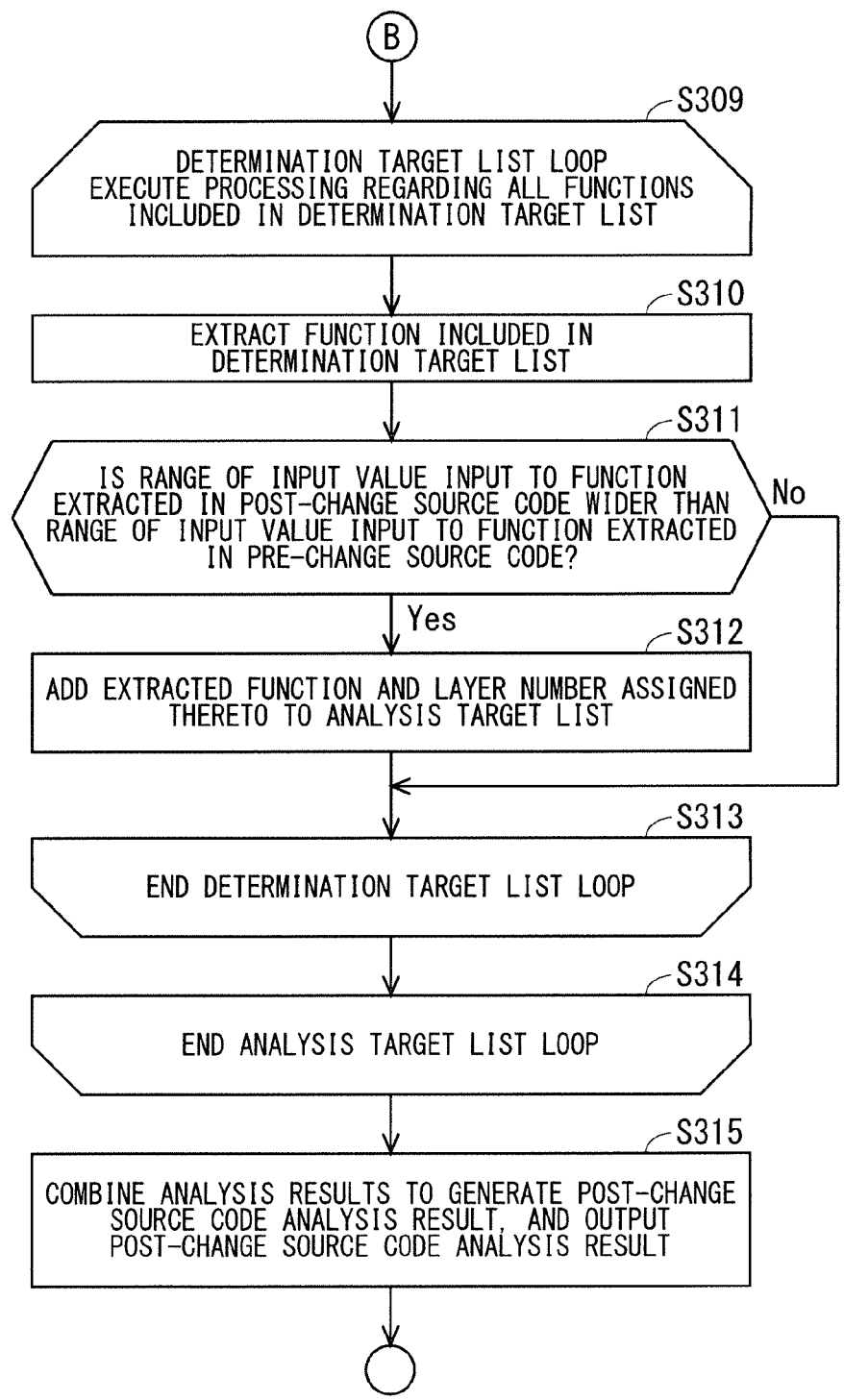
FIG. 14 is a flowchart illustrating a flow of processing performed by the source code analysis apparatus of the third embodiment.

FIG. 13 and FIG. 14 are flowcharts illustrating a flow of processing performed by the source code analysis apparatus of the third embodiment.

The source code analysis apparatus 3 executes Steps S301 to S315 illustrated in FIG. 13 and FIG. 14.

In Step S301, the analysis processing unit 52 acquires the pre-change source code analysis result 42 input to the source code analysis apparatus 3.

In subsequent Step S302, the layer identification processing unit 57 acquires the software layer information 46 input to the source code analysis apparatus 3. Further, the layer identification processing unit 57 extracts the layered structure from the acquired software layer information 46. Further, the layer identification processing unit 57 assigns layer numbers to the functions included in the layered structure sequentially from the function belonging to a higher layer.

In subsequent Step S303, the change function extract processing unit 51 acquires the post-change source code 41 input to the source code analysis apparatus 3 and the pre-change source code 44 stored in the storage 55. Further, the change function extract processing unit 51 extracts a difference between the acquired post-change source code 41 and the acquired pre-change source code 44. Further, the change function extract processing unit 51 extracts the change function from the extracted difference. Further, the change function extract processing unit 51 stores the acquired post-change source code 41 in the storage 55.

In Step S304, the change function extract processing unit 51 adds the extracted change function and a layer number assigned thereto to the analysis target list.

In an analysis target list loop of subsequent Steps S305 to S314, processing is repeatedly executed until processing of Steps S306 to S313 is executed regarding all of the functions included in the analysis target list.

In Step S306, the analysis processing unit 52 extracts a function included in the analysis target list. The analysis processing unit 52 extracts a function assigned the smallest layer number. In this manner, the analysis of the analysis target functions is performed sequentially from the analysis target function belonging to a higher layer.

In Step S307, the analysis processing unit 52 performs an analysis of the extracted function.

In Step S308, the analysis processing unit 52 extracts the influence function that the function subjected to the analysis influences input from the post-change source code 41. Further, the analysis processing unit 52 adds the extracted influence function to a determination target list.

In a determination target list loop of subsequent Steps S309 to S313, processing is repeatedly executed until processing of Steps S310 to S312 is executed regarding all of the functions included in the determination target list.

In Step S310, the analysis necessity determination processing unit 53 extracts a function included in the determination target list.

In subsequent Step S311, the analysis necessity determination processing unit 53 acquires the value range information 71 included in the analysis result 45 stored in the storage 55. Further, the analysis necessity determination processing unit 53 determines whether or not the range of the input value input to the function extracted in the post-change source code 41 is wider than the range of the input value input to the function extracted in the pre-change source code 44. When it is determined that the range of the input value of the former is wider than the range of the input value of the latter, Step S312 is executed. When it is determined that the range of the input value of the former is narrower than the range of the input value of the latter, Step S313 is executed.

In Step S312, the analysis necessity determination processing unit 53 adds the extracted function and a layer number assigned thereto to the analysis target list. In this manner, the analysis target function and the layer number indicating priority of the analysis thereof are added to the analysis target list.

In Step S315, the analysis result processing unit 54 acquires the analysis result 45. Further, the analysis result processing unit 54 combines the acquired analysis results 45 to generate the post-change source code analysis result 43. Further, the analysis result processing unit 54 outputs the generated post-change source code analysis result 43.

The source code analysis apparatus 3 of the third embodiment has effects similar to the effects of the source code analysis apparatus 1 of the first embodiment.

In addition, according to the source code analysis apparatus 3 of the third embodiment, the analysis of the analysis target functions are performed sequentially from the analysis target function included in a higher module to the analysis target function included in a lower module. Thus, an analysis can be less liable to be performed on the analysis target function included in a lower module when input given to the analysis target function included in a higher module to the analysis target function included in a lower module has not determined yet, and situations in which the need of waiting for the analysis of the analysis target function included in the lower module to be performed until the input is determined, the need of performing the analysis of the analysis target function included in a lower module again after the input is determined, and the like can be less liable to occur. In this manner, a time period required for analyzing the post-change source code 41 can be reduced.

4 Fourth Embodiment

In the following, configurations of a source code analysis apparatus of the fourth embodiment different from those of the source code analysis apparatus 1 of the first embodiment will be described. Regarding configurations that are not described, configurations similar to the configurations adopted in the source code analysis apparatus 1 of the first embodiment are also adopted in the source code analysis apparatus of the fourth embodiment.

FIG. 1 is also a block diagram schematically illustrating a hardware configuration of a source code analysis apparatus of the fourth embodiment.

Figure 15:
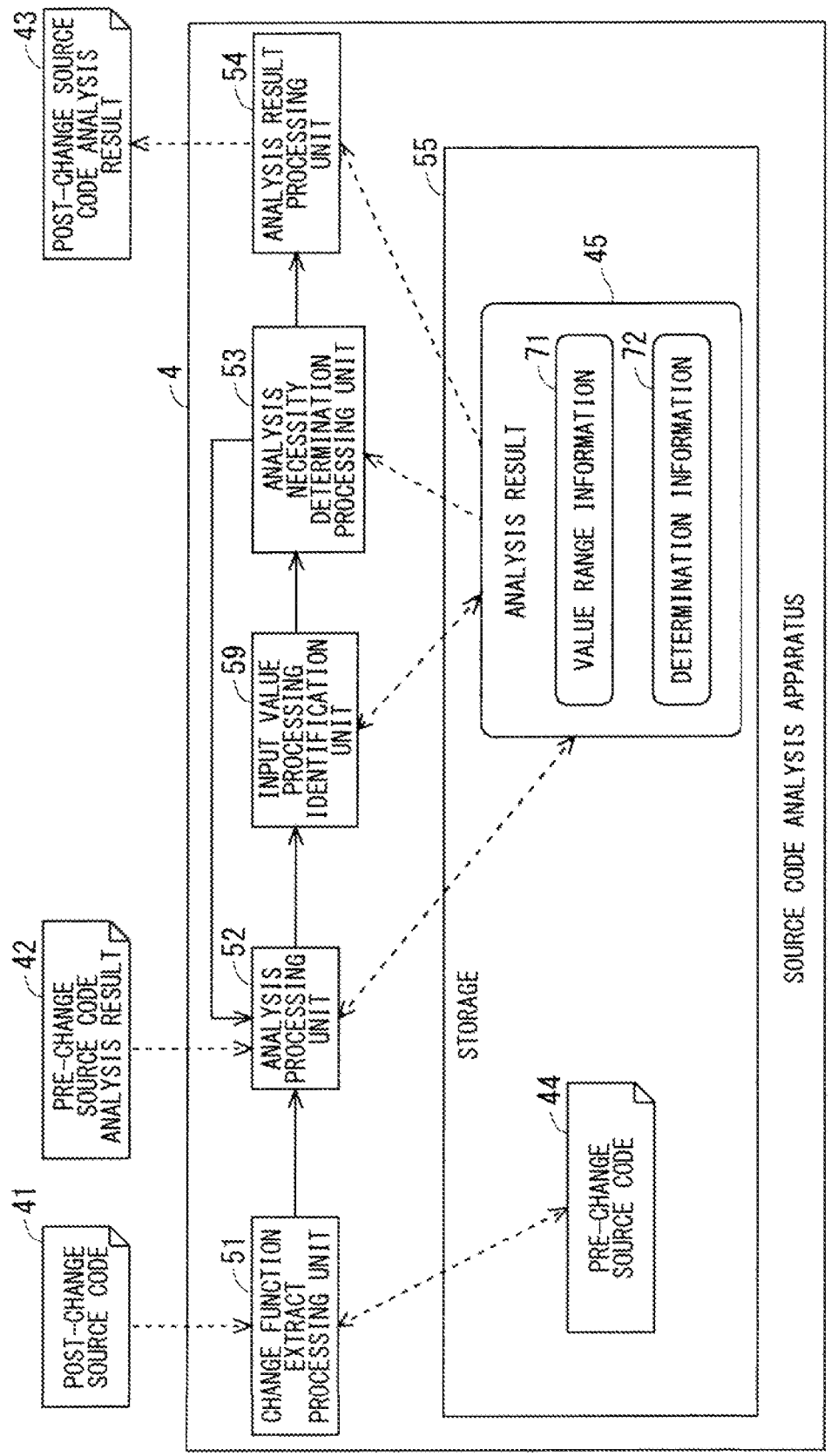
FIG. 15 is a block diagram schematically illustrating a functional configuration of the source code analysis apparatus of the fourth embodiment.

FIG. 15 is a block diagram schematically illustrating a functional configuration of the source code analysis apparatus of the fourth embodiment.

The source code analysis apparatus 4 of the fourth embodiment illustrated in FIG. 15 is different from the source code analysis apparatus 1 of the first embodiment illustrated in FIG. 2 in that an input value processing identification unit 59 is further included.

The input value processing identification unit 59 identifies processing performed on an input value input to a function in the function. Further, the input value processing identification unit 59 limits the range of the input value input to the function, based on the identified processing. For example, the input value processing identification unit 59 raises the upper limit value of the range of the input value input to the function and/or lowers the lower limit value of the range of the input value input to the function, based on the identified processing.

FIG. 16 is a diagram illustrating an example of the post-change source code input to the source code analysis apparatus of the fourth embodiment. FIG. 17 is a diagram illustrating an example of the value range information stored in the source code analysis apparatus of the fourth embodiment.

In the post-change source code 41 illustrated in FIG. 17, the function funcA invokes the funcB( ) having the argument arg1, and the funcB( ) squares the argument arg1 and returns the result as a return value.

Thus, the return value returned by the function funcB when the argument arg1 has a positive value is equal to the return value returned by the function funcB when the argument arg1 is a negative value that has the same absolute value as the absolute value of the positive value. Thus, as illustrated in FIG. 17, in determination of necessity of the analysis of the function funcB, even when the range of the argument arg1 input to the function funcB is −5 or more and 5 or less, the range can be limited to a range of 0 or more and 5 or less depending on the processing of squaring the argument arg1.

Figure 18:
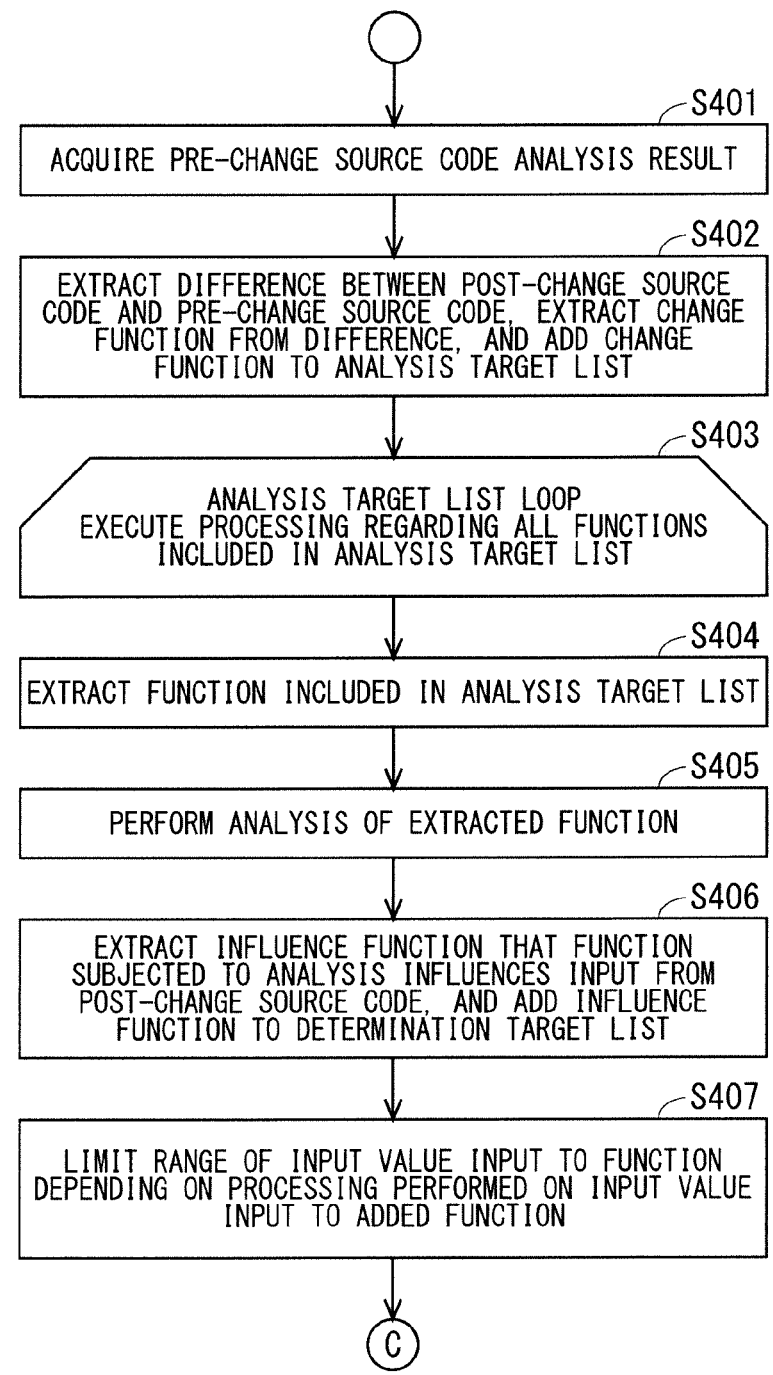
FIG. 18 is a flowchart illustrating a flow of processing performed by the source code analysis apparatus of the fourth embodiment.
Figure 19:
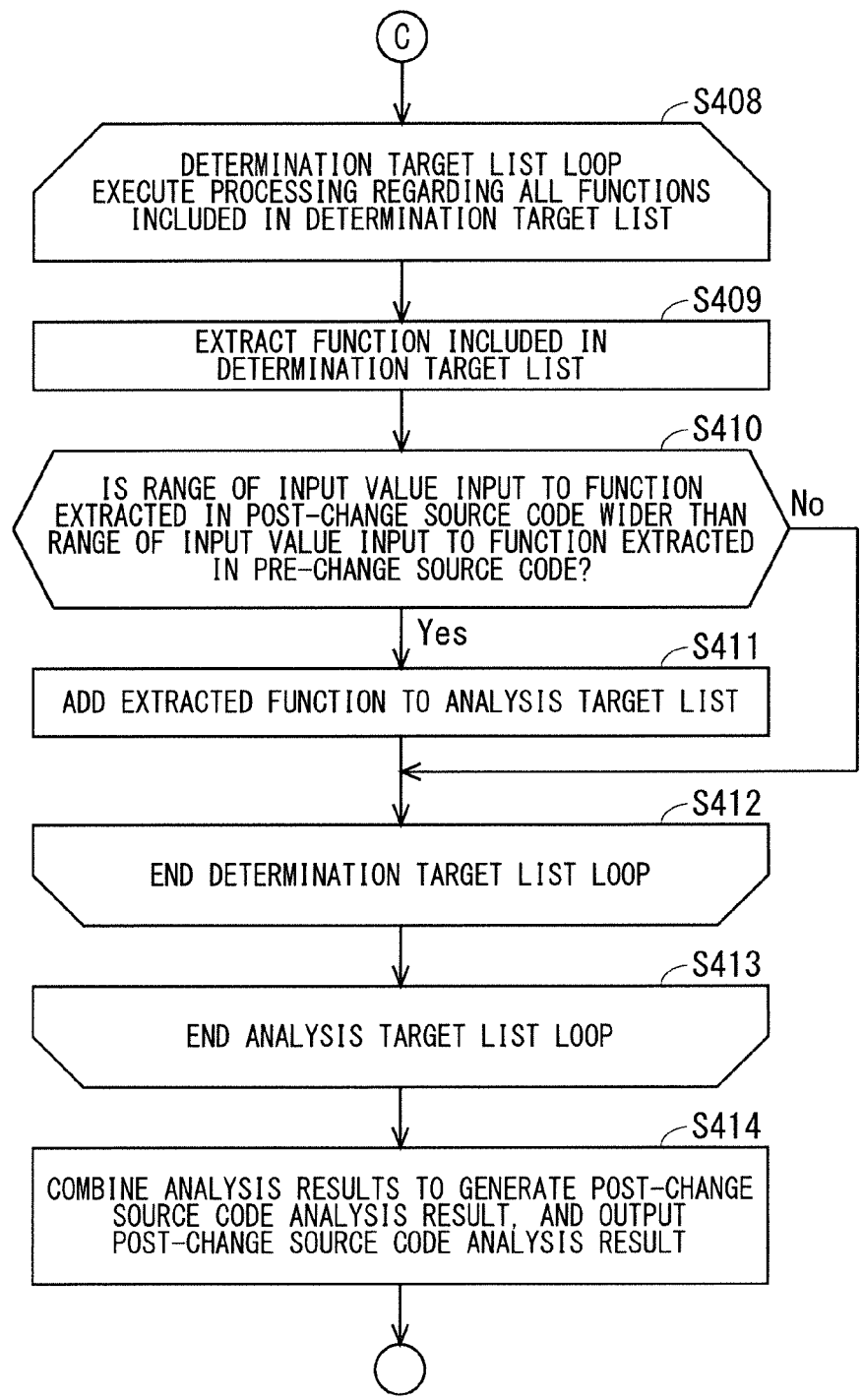
FIG. 19 is a flowchart illustrating a flow of processing performed by the source code analysis apparatus of the fourth embodiment.

FIG. 18 and FIG. 19 are flowcharts illustrating a flow of processing performed by the source code analysis apparatus of the fourth embodiment.

The source code analysis apparatus 4 executes Steps S401 to S414 illustrated in FIG. 18 and FIG. 19.

In Step S401, the analysis processing unit 52 acquires the pre-change source code analysis result 42 input to the source code analysis apparatus 1.

In subsequent Step S402, the change function extract processing unit 51 acquires the post-change source code 41 input to the source code analysis apparatus 1 and the pre-change source code 44 stored in the storage 55. Further, the change function extract processing unit 51 extracts a difference between the post-change source code 41 and the pre-change source code 44. Further, the change function extract processing unit 51 extracts the change function from the extracted difference. Further, the change function extract processing unit 51 adds the extracted change function to an analysis target list. Further, the change function extract processing unit 51 stores the acquired post-change source code 41 in the storage 55.

In an analysis target list loop of subsequent Steps S403 to S413, processing is repeatedly executed until processing of Steps S404 to S412 is executed regarding all of the functions included in the analysis target list.

In Step S404, the analysis processing unit 52 extracts a function included in the analysis target list.

In subsequent Step S405, the analysis processing unit 52 performs an analysis of the extracted function.

In subsequent Step S406, the analysis processing unit 52 extracts the influence function that the function subjected to the analysis influences input from the post-change source code 41. Further, the analysis processing unit 52 adds the extracted influence function to a determination target list.

In subsequent Step S407, the input value processing identification unit 59 limits the range of the input value input to the function depending on processing performed on the input value input to the function added to the determination target list.

In a determination target list loop of subsequent Steps S408 to S412, processing is repeatedly executed until processing of Steps S409 to S411 is executed regarding all of the functions included in the determination target list.

In Step S409, the analysis necessity determination processing unit 53 extracts a function included in the determination target list.

In Step S410, the analysis necessity determination processing unit 53 acquires the value range information 71 included in the analysis result 45 stored in the storage 55. Further, the analysis necessity determination processing unit 53 determines whether or not the range of the input value input to the function extracted in the post-change source code 41 is wider than the range of the input value input to the function extracted in the pre-change source code 44. When it is determined that the range of the input value of the former is wider than the range of the input value of the latter, Step S411 is executed. When it is determined that the range of the input value of the former is narrower than the range of the input value of the latter, Step S412 is executed.

In Step S411, the analysis necessity determination processing unit 53 adds the extracted function to the analysis target list. In this manner, the analysis target function is added to the analysis target list.

In Step S414, the analysis result processing unit 54 acquires the analysis result 45. Further, the analysis result processing unit 54 combines the acquired analysis results 45 to generate the post-change source code analysis result 43. Further, the analysis result processing unit 54 outputs the generated post-change source code analysis result 43.

The source code analysis apparatus 4 of the fourth embodiment has effects similar to the effects of the source code analysis apparatus 1 of the first embodiment.

In addition, according to the source code analysis apparatus 4 of the fourth embodiment, the range of the input value input to the function is limited depending on processing performed on the input value input to the function. Thus, a time period required for analyzing the post-change source code 41 can be reduced.

5 Fifth Embodiment

In the following, configurations of a source code analysis apparatus of the fifth embodiment different from those of the source code analysis apparatus 1 of the first embodiment will be described. Regarding configurations that are not described, configurations similar to the configurations adopted in the source code analysis apparatus 1 of the first embodiment are also adopted in the source code analysis apparatus of the fifth embodiment.

FIG. 1 is also a block diagram schematically illustrating a hardware configuration of a source code analysis apparatus of the fifth embodiment.

Figure 20:
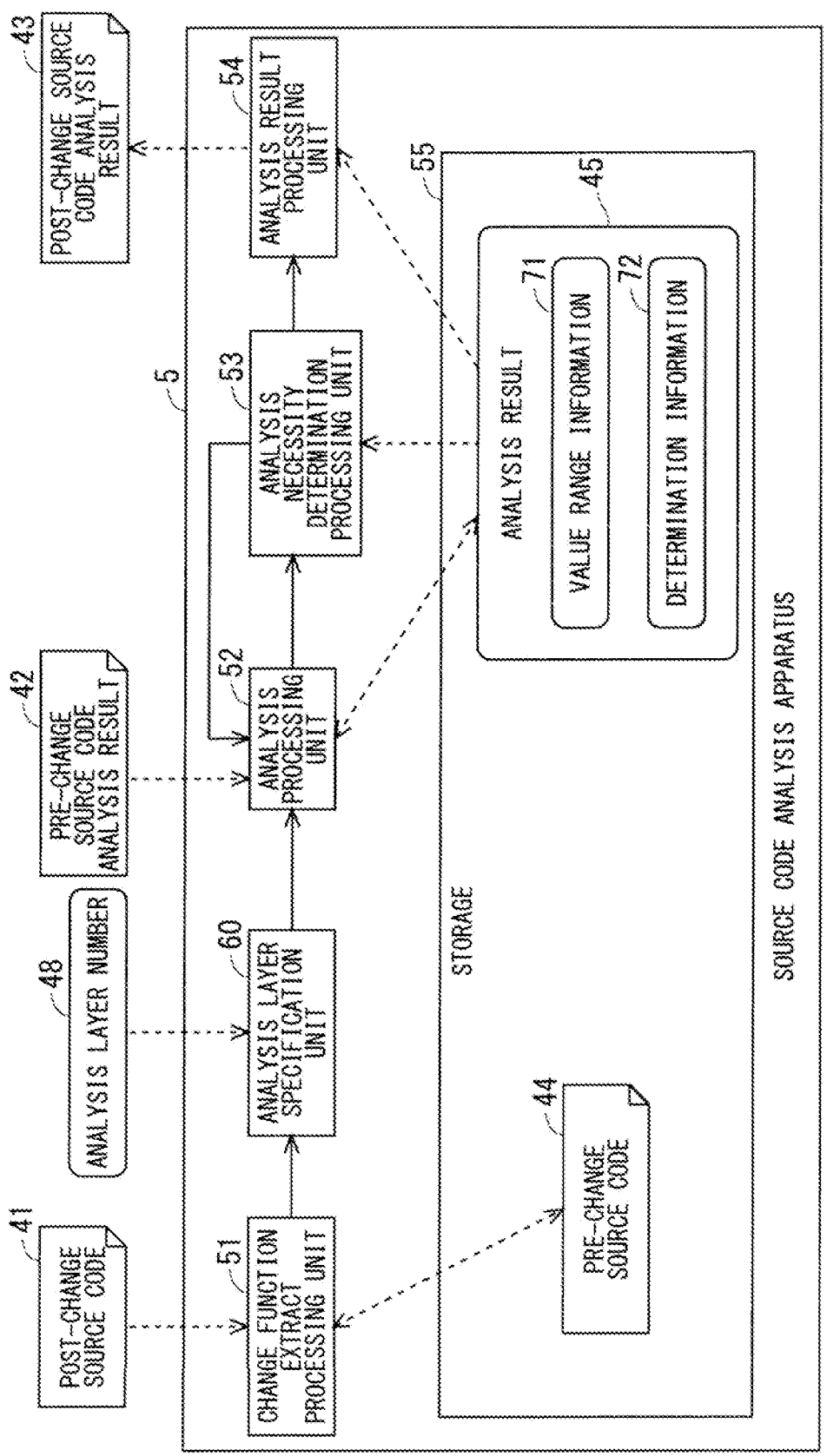
FIG. 20 is a block diagram schematically illustrating a functional configuration of the source code analysis apparatus of the fifth embodiment.

FIG. 20 is a block diagram schematically illustrating a functional configuration of the source code analysis apparatus of the fifth embodiment.

The source code analysis apparatus 5 of the fifth embodiment illustrated in FIG. 20 is different from the source code analysis apparatus 1 of the first embodiment illustrated in FIG. 2 in that an analysis layer number 48 is further input, and an analysis layer specification unit 60 is further included.

The analysis layer number 48 indicates an upper limit of a layer difference between the layer to which the change function belongs and the layer to which the analysis target function belongs.

The analysis layer specification unit 60 specifies the layer to which the analysis target function belongs. The analysis layer specification unit 60 acquires the analysis layer number 48 input to the source code analysis apparatus 5, and specifies the layer to which the analysis target function belongs according to the acquired analysis layer number 48.

The analysis processing unit 52 performs the analysis of the analysis target function belonging to the specified layer. However, the analysis processing unit 52 does not perform an analysis of the functions belonging to layers other than the specified layer.

In this manner, only the functions apart from the change function by the layer difference equal to or less than the upper limit of the layer difference specified by the analysis layer number 48 are designated as the analysis target functions, functions that are apart by the layer difference greater than the upper limit are not designated as the analysis target functions, and the analysis of only the analysis target function belonging to a layer close to the layer to which the change function belongs can be performed.

Figure 21:
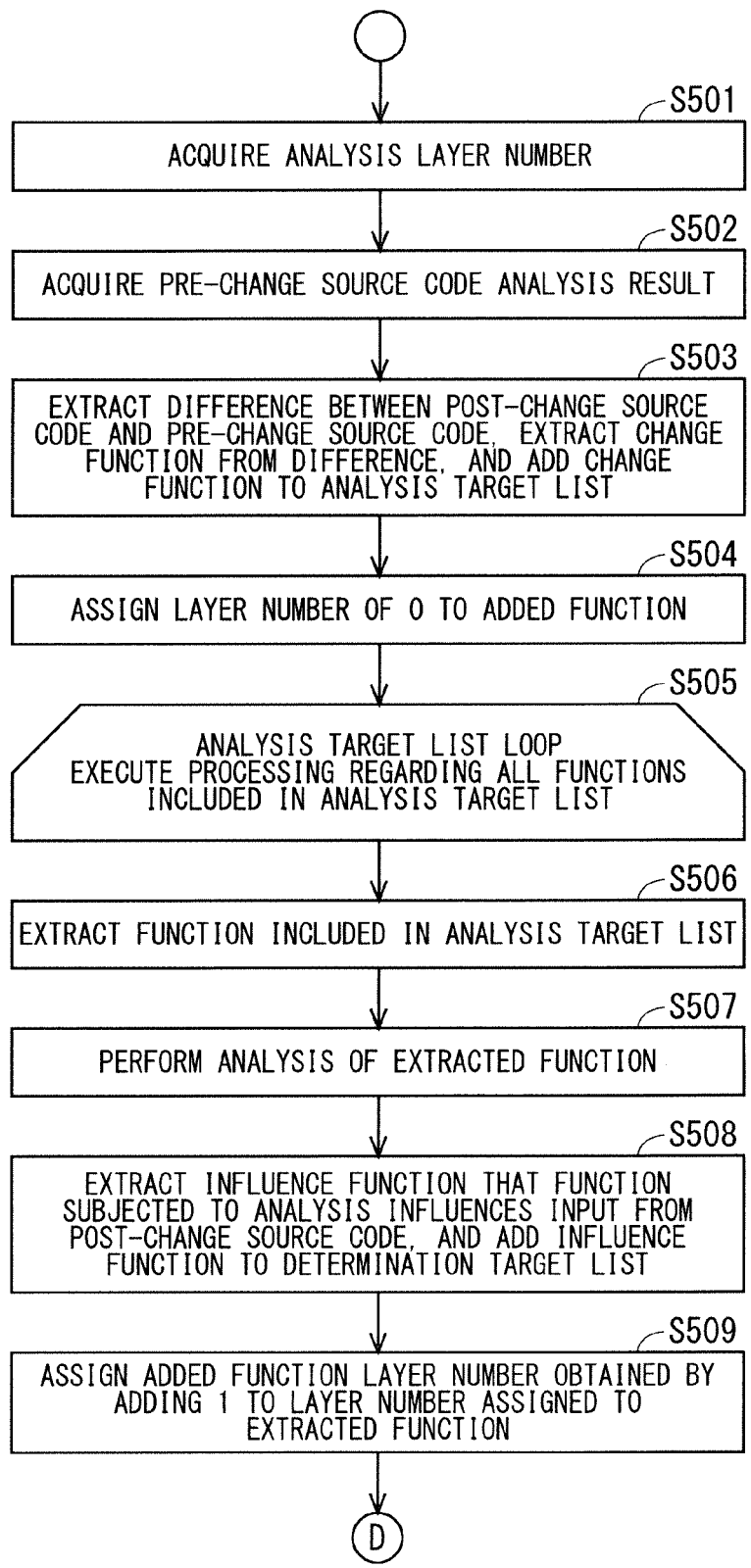
FIG. 21 is a flowchart illustrating a flow of processing performed by the source code analysis apparatus of the fifth embodiment.
Figure 22:
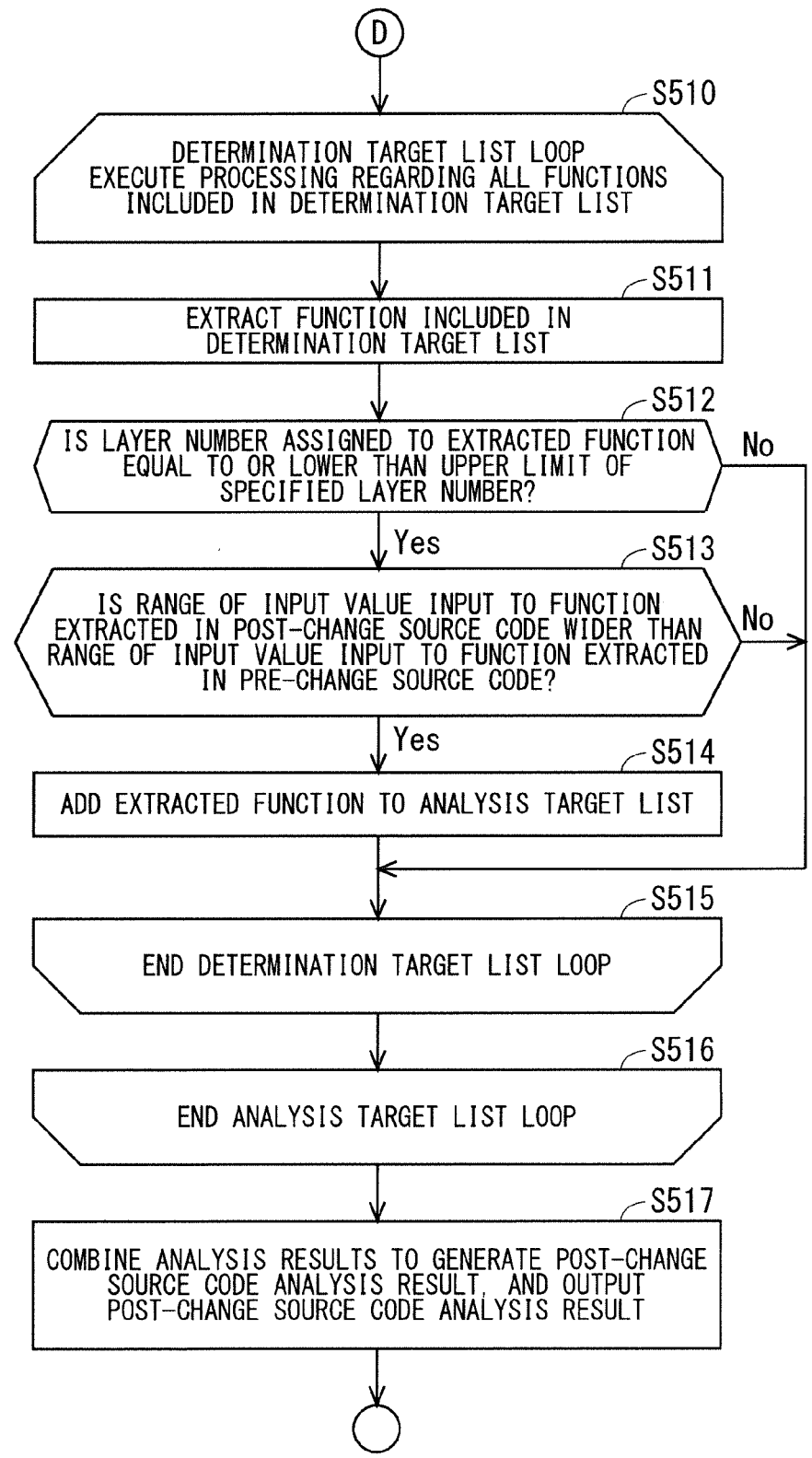
FIG. 22 is a flowchart illustrating a flow of processing performed by the source code analysis apparatus of the fifth embodiment.

FIG. 21 and FIG. 22 are flowcharts illustrating a flow of processing performed by the source code analysis apparatus of the fifth embodiment.

The source code analysis apparatus 5 of the fifth embodiment executes Steps S501 to S517 illustrated in FIG. 21 and FIG. 22.

In Step S501, the analysis layer specification unit 60 acquires the analysis layer number 48 input to the source code analysis apparatus 5.

In Step S502, the analysis processing unit 52 acquires the pre-change source code analysis result 42 input to the source code analysis apparatus 5.

In subsequent Step S503, the change function extract processing unit 51 acquires the post-change source code 41 input to the source code analysis apparatus 5 and the pre-change source code 44 stored in the storage 55. Further, the change function extract processing unit 51 extracts a difference between the post-change source code 41 and the pre-change source code 44. Further, the change function extract processing unit 51 extracts the change function from the extracted difference. Further, the change function extract processing unit 51 adds the extracted change function to an analysis target list. Further, the change function extract processing unit 51 stores the acquired post-change source code 41 in the storage 55.

In subsequent Step S504, the analysis layer specification unit 60 assigns layer number of 0 to the added change function.

In an analysis target list loop of subsequent Steps S505 to S516, processing is repeatedly executed until processing of Steps S506 to S515 is executed regarding all of the functions included in the analysis target list.

In Step S506, the analysis processing unit 52 extracts a function included in the analysis target list.

In subsequent Step S507, the analysis processing unit 52 performs an analysis of the extracted function.

In subsequent Step S508, the analysis processing unit 52 extracts the influence function that the function subjected to the analysis influences input from the post-change source code 41. Further, the analysis processing unit 52 adds the extracted influence function to a determination target list.

In subsequent Step S509, the analysis layer specification unit 60 assigns the added function a layer number obtained by adding 1 to the layer number assigned to the extracted function.

In a determination target list loop of subsequent Steps S510 to S515, processing is repeatedly executed until processing of Steps S511 to S514 is executed regarding all of the functions included in the determination target list.

In Step S511, the analysis necessity determination processing unit 53 extracts a function included in the determination target list.

In Step S512, the analysis necessity determination processing unit 53 determines whether or not the layer number assigned to the extracted function is equal to or lower than the upper limit of the layer number specified by the analysis layer specification unit 60. When it is determined that the layer number assigned to the extracted function is equal to or lower than the upper limit of the layer number specified by the analysis layer specification unit 60, Step S513 is executed. When it is determined that the layer number assigned to the extracted function is greater the upper limit of the layer number specified by the analysis layer specification unit 60, Step S515 is executed.

In Step S513, the analysis necessity determination processing unit 53 acquires the value range information 71 included in the analysis result 45 stored in the storage 55. Further, the analysis necessity determination processing unit 53 determines whether or not the range of the input value input to the function extracted in the post-change source code 41 is wider than the range of the input value input to the function extracted in the pre-change source code 44. When it is determined that the range of the input value of the former is wider than the range of the input value of the latter, Step S514 is executed. When it is determined that the range of the input value of the former is narrower than the range of the input value of the latter, Step S515 is executed.

In Step S514, the analysis necessity determination processing unit 53 adds the extracted function to the analysis target list. In this manner, the analysis target function is added to the analysis target list.

In Step S517, the analysis result processing unit 54 acquires the analysis result 45. Further, the analysis result processing unit 54 combines the acquired analysis results 45 to generate the post-change source code analysis result 43. Further, the analysis result processing unit 54 outputs the generated post-change source code analysis result 43.

The source code analysis apparatus 5 of the fifth embodiment has effects similar to the effects of the source code analysis apparatus 1 of the first embodiment.

In addition, according to the source code analysis apparatus 5 of the fifth embodiment, only the functions apart from the change function by the layer difference equal to or less than the upper limit of the layer difference specified by the analysis layer number 48 are designated as the analysis target functions, functions that are apart by the layer difference greater than the upper limit are not designated as the analysis target functions, and the analysis of only the analysis target function belonging to a layer close to the layer to which the change function belongs can be performed. In this manner, a time period required for analyzing the post-change source code 41 can be reduced.

6 Sixth Embodiment

In the following, configurations of a source code analysis apparatus of the sixth embodiment different from those of the source code analysis apparatus 1 of the first embodiment will be described. Regarding configurations that are not described, configurations similar to the configurations adopted in the source code analysis apparatus 1 of the first embodiment are also adopted in the source code analysis apparatus of the sixth embodiment.

FIG. 1 is also a block diagram schematically illustrating a hardware configuration of a source code analysis apparatus of the sixth embodiment.

Figure 23:
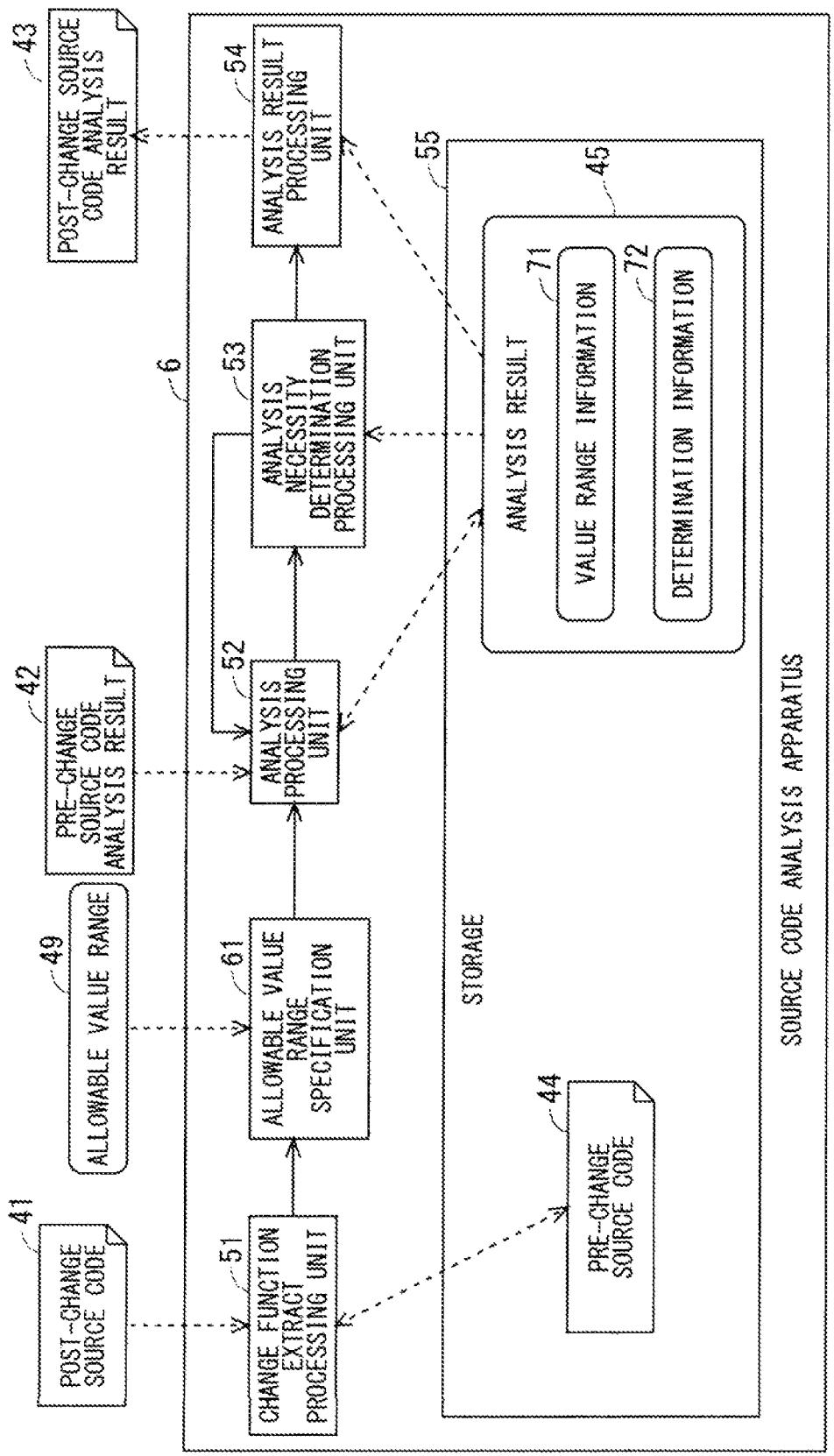
FIG. 23 is a block diagram schematically illustrating a functional configuration of the source code analysis apparatus of the sixth embodiment.

FIG. 23 is a block diagram schematically illustrating a functional configuration of the source code analysis apparatus of the sixth embodiment.

The source code analysis apparatus 6 of the sixth embodiment illustrated in FIG. 23 is different from the source code analysis apparatus 1 of the first embodiment illustrated in FIG. 2 in that an allowable value range 49 is further input, and an allowable value range specification unit 61 is further included.

The input allowable value range 49 indicates an allowable range of the input value input to the change function and the function included in the influence function.

The allowable value range specification unit 61 specifies the allowable value range indicating the allowable range of the input value input to the change function and the function included in the influence function. The allowable value range specification unit 61 acquires the allowable value range 49 input to the source code analysis apparatus 6, and specifies the allowable value range according to the acquired allowable value range 49.

When the range of the input value input to the change function and the function included in the influence function is narrower than the allowable range of the input value input to the function indicated by the specified allowable value range, the analysis necessity determination processing unit 53 determines that the function is not the analysis target function, whereas when the range of the input value input to the function is wider than the allowable range of the input value input to the function indicated by the specified allowable value range, the analysis necessity determination processing unit 53 determines that the function is the analysis target function.

In this manner, when the range of a possible value of the input value input to the change function and the function included in the influence function is known in advance at the time point when the post-change source code 41 is set, the number of analysis target functions to be subjected to the analysis can be reduced by inputting the allowable value range 49 indicating the range to the source code analysis apparatus 6.

Figure 24:
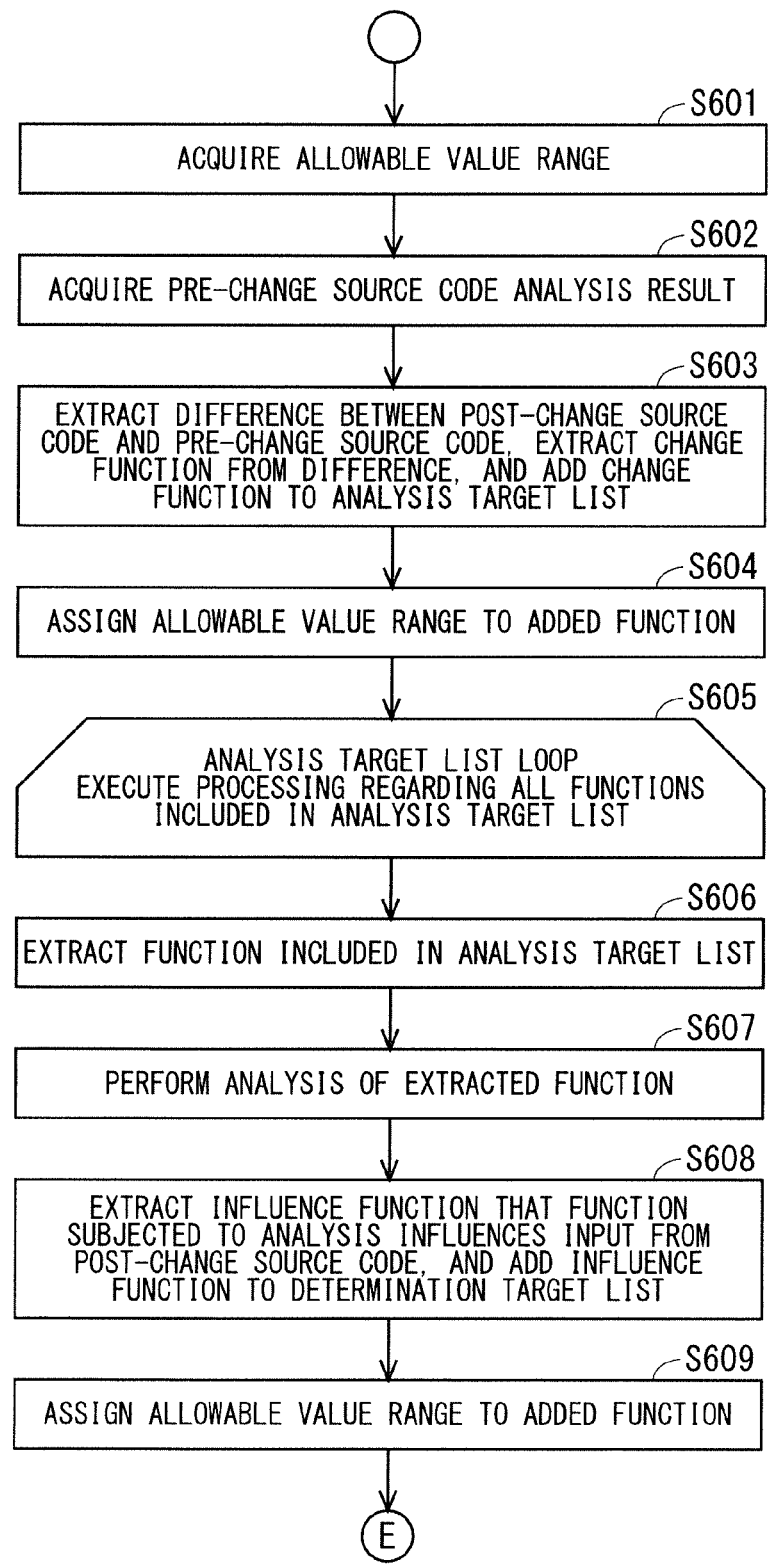
FIG. 24 is a flowchart illustrating a flow of processing performed by the source code analysis apparatus of the sixth embodiment.
Figure 25:
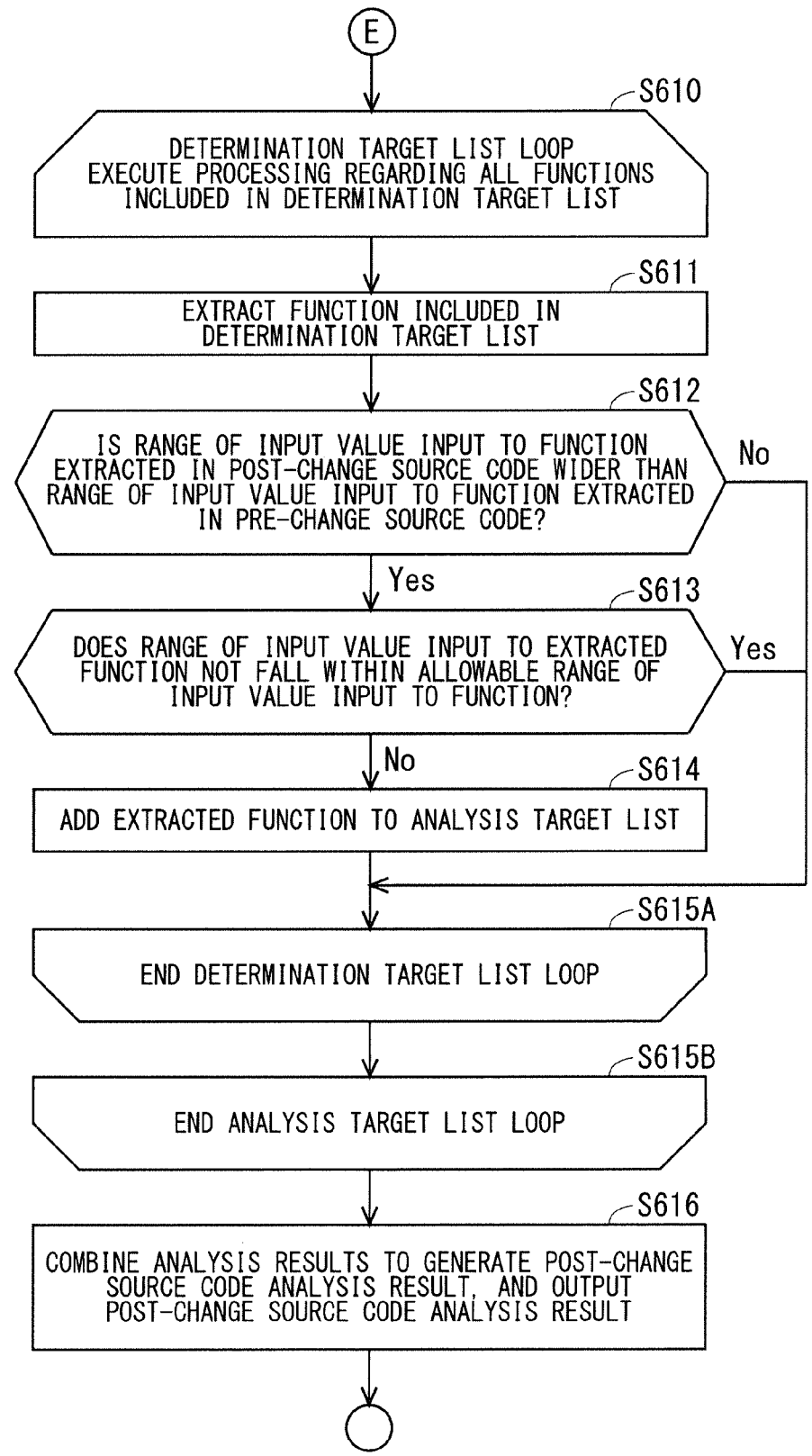
FIG. 25 is a flowchart illustrating a flow of processing performed by the source code analysis apparatus of the sixth embodiment.

FIG. 24 and FIG. 25 are flowcharts illustrating a flow of processing performed by the source code analysis apparatus of the sixth embodiment.

The source code analysis apparatus 6 executes Steps S601 to S616 illustrated in FIG. 24 and FIG. 25.

In Step S601, the allowable value range specification unit 61 acquires the allowable value range 49 input to the source code analysis apparatus 6.

In subsequent Step S602, the analysis processing unit 52 acquires the pre-change source code analysis result 42 input to the source code analysis apparatus 1.

In subsequent Step S603, the change function extract processing unit 51 acquires the post-change source code 41 input to the source code analysis apparatus 1 and the pre-change source code 44 stored in the storage 55. Further, the change function extract processing unit 51 extracts a difference between the post-change source code 41 and the pre-change source code 44. Further, the change function extract processing unit 51 extracts the change function from the extracted difference. Further, the change function extract processing unit 51 adds the extracted change function to an analysis target list. Further, the change function extract processing unit 51 stores the acquired post-change source code 41 in the storage 55.

In subsequent Step S604, the allowable value range specification unit 61 assigns an allowable value range to the added function according to the acquired allowable value range 49.

In an analysis target list loop of subsequent Steps S605 to S615B, processing is repeatedly executed until processing of Steps S606 to S614 is executed regarding all of the functions included in the analysis target list.

In Step S606, the analysis processing unit 52 extracts a function included in the analysis target list.

In subsequent Step S607, the analysis processing unit 52 performs an analysis of the extracted function.

In subsequent Step S608, the analysis processing unit 52 extracts the influence function that the function subjected to the analysis influences input from the post-change source code 41. Further, the analysis processing unit 52 adds the extracted influence function to a determination target list.

In subsequent Step S609, the allowable value range specification unit 61 assigns an allowable value range to the added function according to the acquired allowable value range 49.

In a determination target list loop of subsequent Steps S610 to S615A, processing is repeatedly executed until processing of Steps S611 to S614 is executed regarding all of the functions included in the determination target list.

In Step S611, the analysis necessity determination processing unit 53 extracts a function included in the determination target list.

In Step S612, the analysis necessity determination processing unit 53 acquires the value range information 71 included in the analysis result 45 stored in the storage 55. Further, the analysis necessity determination processing unit 53 determines whether or not the range of the input value input to the function extracted in the post-change source code 41 is wider than the range of the input value input to the function extracted in the pre-change source code 44. When it is determined that the range of the input value of the former is wider than the range of the input value of the latter, Step S613 is executed. When it is determined that the range of the input value of the former is narrower than the range of the input value of the latter, Step S615A is executed.

In Step S613, the analysis necessity determination processing unit 53 determines whether the range of the input value input to the extracted function does not fall within the allowable range of the input value input to the function. When it is determined that the range of the input value of the former does not fall within the range of the input value of the latter, Step S614 is executed. When it is determined that the range of the input value of the former falls within the range of the input value of the latter, Step S615A is executed.

In Step S614, the analysis necessity determination processing unit 53 adds the extracted function to the analysis target list. In this manner, the analysis target function is added to the analysis target list.

In Step S616, the analysis result processing unit 54 acquires the analysis result 45. Further, the analysis result processing unit 54 combines the acquired analysis results 45 to generate the post-change source code analysis result 43. Further, the analysis result processing unit 54 outputs the generated post-change source code analysis result 43.

The source code analysis apparatus 6 of the sixth embodiment has effects similar to the effects of the source code analysis apparatus 1 of the first embodiment.

In addition, according to the source code analysis apparatus 6 of the sixth embodiment, when the range of a possible value of the input value input to the change function and the function included in the influence function is known in advance at the time point when the post-change source code 41 is set, the number of analysis target functions to be subjected to the analysis can be reduced by inputting the allowable value range 49 indicating the range to the source code analysis apparatus 6. In this manner, a time period required for analyzing the post-change source code 41 can be reduced.

Note that, in the present invention, each embodiment can be freely combined, and each embodiment can be modified or omitted as appropriate within the scope of the invention.

While the invention has been shown and described in detail, the foregoing description is in all aspects illustrative and not restrictive. It is therefore understood that numerous unillustrated modifications can be devised without departing from the scope of the present invention.

EXPLANATION OF REFERENCE SIGNS

1, 2, 3, 4, 5, 6 source code analysis apparatus, 51 change function extract processing unit, 52 analysis processing unit, 53 analysis necessity determination processing unit, 54 analysis result processing unit, 56 verified information storage processing unit, 57 layer identification processing unit, 58 analysis order specification unit, 59 input value processing identification unit, 60 analysis layer specification unit, 61 allowable value range specification unit.

The invention claimed is:

1. A source code analysis apparatus, comprising:
   a processor to execute a program; and
   a memory to store the program which, when executed by the processor, performs processes of:
   extracting a change function included in a changed part from a pre-change source code, which is included in a post-change source code;
   extracting, from the post-change source code, an influence function to which an input is given by the change function;
   determining whether or not the function is an analysis target function which needs to be analyzed, based on a range of an input value input to the change function and a function included in the influence function;
   performing an analysis of the analysis target function; and
   outputting an analysis result of the post-change source code, which includes an analysis result of the analysis target function.

2. The source code analysis apparatus according to claim 1, wherein:
   when the range of the input value input to the function in the post-change source code is narrower than the range of the input value input to the function in the pre-change source code in determining whether or not the function is the analysis target function, it is determined that the function is not the analysis target function.

3. The source code analysis apparatus according to claim 1, wherein:
   the input value input to the function includes at least one selected from the group consisting of an argument of the function, a return value returned by another function invoked by the function, and a global variable read by the function.

4. The source code analysis apparatus according to claim 1, wherein:
   in the analysis of the analysis target function, verification is performed by changing the input value input to the analysis target function, and when the verification is already performed, verification of a value other than a value subjected to the verification is performed by changing the input value input to the analysis target function, and verified information indicating the value subjected to the verification is stored in the memory.

5. The source code analysis apparatus according to claim 1, to further comprising:
specifying analysis order of the analysis target function; and
performing the analysis of the analysis target function sequentially in the analysis order of the analysis target function.

6. The source code analysis apparatus according to claim 5, wherein
in the analysis order of the analysis target function, the analysis is performed later as a layer to which the analysis target function belongs is higher in a layered structure of functions included in the post-change source code.

7. The source code analysis apparatus according to claim 6, further comprising:
identifying the layer.

8. The source code analysis apparatus according to claim 1, further comprising:
identifying processing performed on the input value input to the function in the function, and limiting the range of the input value input to the function in the post-change source code according to the processing.

9. The source code analysis apparatus according to claim 1, further comprising:
specifying a layer to which the analysis target function belongs; and
performing the analysis of the analysis target function belonging to the specified layer.

10. The source code analysis apparatus according to claim 1, further comprising:
specifying an allowable value range indicating an allowable range of the input value input to the function, wherein
when the range of the input value input to the function is narrower than the allowable range of the input value input to the function, it is determined that the function is not the analysis target function.

* * * * *